(12) United States Patent
Buse

(10) Patent No.: US 9,180,402 B2
(45) Date of Patent: Nov. 10, 2015

(54) SYSTEM AND METHOD FOR TREATING NATURAL GAS THAT CONTAINS METHANE

(75) Inventor: Gerhard Buse, Winsen/Luhe (DE)

(73) Assignee: Ingenieurburo Buse GmbH, Winsen/Luhe (DE)

(*) Notice: Subject to any disclaimer, the term of this patent is extended or adjusted under 35 U.S.C. 154(b) by 24 days.

(21) Appl. No.: 14/122,311

(22) PCT Filed: Feb. 21, 2012

(86) PCT No.: PCT/EP2012/052956
§ 371 (c)(1),
(2), (4) Date: Nov. 26, 2013

(87) PCT Pub. No.: WO2012/163554
PCT Pub. Date: Dec. 6, 2012

(65) Prior Publication Data
US 2014/0096681 A1    Apr. 10, 2014

(30) Foreign Application Priority Data
May 31, 2011    (DE) .......................... 10 2011 102 923

(51) Int. Cl.
*B01D 53/14*    (2006.01)
*B01D 19/00*    (2006.01)
*B01D 53/22*    (2006.01)

(52) U.S. Cl.
CPC ........ *B01D 53/1425* (2013.01); *B01D 19/0031* (2013.01); *B01D 53/1475* (2013.01); *B01D 2252/103* (2013.01); *B01D 2256/245* (2013.01)

(58) Field of Classification Search
CPC .......... B01D 19/0031; B01D 19/0047; B01D 53/1425; B01D 53/1475; B01D 53/226; B01D 53/229; B01D 2252/103; B01D 2256/245; C10L 3/102

USPC .............................................. 96/6; 95/46, 236
See application file for complete search history.

(56) References Cited

U.S. PATENT DOCUMENTS 3,652,433 A * 3/1972 Thompson .................... 205/758
4,235,715 A * 11/1980 Wiegert ........................ 210/670
(Continued)

FOREIGN PATENT DOCUMENTS

EP          0252169 A1    1/1988
WO     2010/014774 A2    2/2010

OTHER PUBLICATIONS

International Search Report, mailed May 30, 2012, for International Patent Application No. PCT/EP2012/052956, 6 pages.

*Primary Examiner* — Jason M Greene
(74) *Attorney, Agent, or Firm* — Casimir Jones, S.C.

(57) ABSTRACT

The invention relates to a system for treating natural gas that contains methane, comprising: a) at least one degassing module (1) and/or at least one percolator, and b) at least one gas exchanging module (2). The invention is characterized in that the degassing module (1) and/or the percolator and the gas exchanging module (2) are connected in a water circuit and arranged successively in the flow direction of the water. The water is degassed in the degassing module (1) and/or percolator, and the degassed water absorbs undesired gases from fed natural gas in the gas exchanging module (2). The fed natural gas is fed to the at least one gas exchanging module (2) in countercurrent to the degassed water. The invention further relates to a method for treating natural gas that contains methane, said method being carried out in the system according to the invention.

33 Claims, 7 Drawing Sheets

(56) References Cited

U.S. PATENT DOCUMENTS

| | | | |
|---|---|---|---|
| 4,957,715 A * | 9/1990 | Grover et al. | 95/236 |
| 6,210,467 B1 * | 4/2001 | Howard | 95/236 |
| 6,228,145 B1 | 5/2001 | Falk-Pedersen et al. | |
| 8,007,567 B2 | 8/2011 | Roe et al. | |
| 2009/0156875 A1 * | 6/2009 | Tomioka et al. | 95/44 |
| 2010/0037772 A1 * | 2/2010 | Roe et al. | 95/42 |
| 2011/0223650 A1 * | 9/2011 | Saunders et al. | 435/266 |

* cited by examiner

Figure 5: Variation of volume flow of water and gauge pressure of strpping gas
Ex 1.1 (x): Gauge pressure PI cp011 = -0.8 bar;
Ex 1.2 (♦) Gauge pressure PI cp011 = -0.6 bar.

Figure 6: Variation of volume flow of biogas and gauge pressure of stripping gas
Ex 2.1 (x): Gauge pressure PI CP011 = -0.8bar;
Ex 2.2  (♦) : Gauge pressure PI CP011 = -0.6 bar.

SYSTEM AND METHOD FOR TREATING NATURAL GAS THAT CONTAINS METHANE

This application is a §371 U.S. National Entry of PCT/EP2012/052956, filed Feb. 21, 2012, which is incorporated by reference in its entirety and which claims the benefit of German Application No. 102011102923.4, filed May 31, 2011.

Gas from natural sources encompasses natural gas and biogas. Natural gas and biogas are employed mainly for heating dwellings and commercial premises, for power generation and are also used, inter alia, as fuel for motor vehicles. Thus, combustible gas for energy generation is produced at the present time by means of what are known as biogas plants in many parts of Europe. Biogas usually comprises not only the energy carrier methane ($CH_4$) but also large troublesome proportions of other gases, in particular, carbon dioxide ($CO_2$) and hydrogen sulfide ($H_2S$). The methane content of biogas is usually 50-60%. The remaining 40-50% are made up of undesirable gases. Natural gas, too, is a gas mixture whose main constituent methane is usually present, depending on the natural gas reservoirs, in an amount of from 65% to 99% and which likewise comprises up to 35% of hydrogen sulfide and up to 10% of carbon dioxide as undesirable secondary constituents.

The gases from natural sources which are contaminated with a high proportion of hydrogen sulfide and/or carbon dioxide, also referred to as "sour gases", have to be freed of hydrogen sulfide and carbon dioxide for a variety of reasons. Even carbon dioxide concentrations above 5% in air breathed by human beings leads to breathing difficulties and unconsciousness. More than 8% of carbon dioxide in air breathed in leads to death within as little as half an hour to one hour. Apart from the toxic effect of carbon dioxide, it is likewise known that hydrogen sulfide in the sour gas, in particular in combination with water, attacks gas pipelines and blocks these by hydrate formation.

Hydrogen sulfide ($H_2S$) is also undesirable because sulfur-containing deposits can be formed during combustion of the gas from natural sources. Carbon dioxide ($CO_2$) is already fully oxidized and reduces the joule value of the gas per unit volume of the gas.

Gas from natural sources, both natural gas and biogas, can be utilized by means of combined heating and power stations (gas engines with power generators). However, a combined heating and power station is only efficient when the waste heat of the engine can be utilized in a useful way. This is the case when, for example, not only a biogas plant can be heated by means of a combined heating and power station but also, for example, a swimming pool or a nursery, but this is possible only in very rare cases.

One purposeful use of the biogas would be feeding it into the existing natural gas network. However, in order for biogas to be able to be fed into natural gas networks, the methane content has to be greater than 95%. Normal biogas therefore has the disadvantage that owing to its high content of undesirable gases, for example hydrogen sulfide ($H_2S$) and carbon dioxide ($CO_2$), it is unsuitable for feeding into natural gas networks. The same also applies to sour gas from natural gas reservoirs from which the undesirable secondary constituents such as carbon dioxide, hydrogen sulfide or else relatively large amounts of nitrogen firstly have to be removed before the remaining gas mixture, which consists predominantly of methane, can be fed into the gas supply network.

The degassing of liquids by means of membrane technology is likewise known in the prior art, for example in the production of boiler feed water or relatively high-quality high-purity water for the pharmaceutical sector or semiconductor technology, or, for example, in the degassing of hydraulic fluids. An example of such a use of degassing of liquids over membranes is described in WO 98/48175.

Plants and processes for treating biogas are known in the prior art. An example of such a plant is described in EP 1 726 352 A1, which discloses a plant and process in which the biogas or putrefaction gas is subjected to a drying process and a desulfurization process. For this purpose, the plant has a gas dryer unit and a desulfurization unit. During the drying process, heat energy is withdrawn from the biogas and can then be introduced into the desulfurization process. In this process, the drying process is carried out using a refrigerant. The desulfurization process is carried out here by means of bacteria. A disadvantage of this known process is the need for refrigerant and also for bacteria which are suitable for bringing about desulfurization of the biogas.

A further process known in the prior art for purifying biogas is the pressurized water scrub (Zeitschrift Energy 2.0, June 2008). Processes based on a pressurized water scrub are based on the principle of differing solubilities of $CO_2$ and methane. Water serves as scrub liquid and dissolves the $CO_2$ under superatmospheric pressure in an absorption column, with the solubility being highest at high pressure and low temperature. The scrubbing process which has already become established in industry in Sweden makes use of the similar characteristics in respect of the solubility of $CO_2$ and hydrogen sulfide. Both constituents of the raw biogas are separated off at the same time, which firstly makes prepurification of the gas unnecessary but requires a final purification of the sulfur-contaminated $CO_2$ offgas. This is achieved, for example, by means of biofilters which treat the offgas. The scrubbing water itself is regenerated again in a downstream desorption column and is available again to the process.

Furthermore, processes for treating biogas by means of pressure swing adsorption (PSA) are known in the prior art. An example of a PSA process is disclosed in EP 0 512 170 A1. Such processes are dry membrane processes which make use of the adsorption of gases on a molecular sieve, but such processes have the disadvantage that they have to operate using high pressures. A PSA process for treating biogas is also described in Zeitschrift Energy 2.0, June 2008. In such a PSA process, a gas, for example $CO_2$, is separated off from a gas mixture by means of a molecular sieve. The superatmospheric pressure binds the $CO_2$ to a molecular sieve until saturation is reached. Excess gas mixture, e.g. raw biogas, can then flow to a next molecular sieve. Such a plant has the disadvantage that it has to operate using high pressures in order to treat the gas mixture, e.g. biogas.

It is therefore an object of the present invention to provide a plant for treating methane-containing gas from natural sources, in particular natural gas and biogas, which avoids the above-described disadvantages of known plants and makes it possible to treat methane-containing gas from natural sources, in particular natural gas and biogas, so as to give a particularly high content of methane.

The invention achieves this object by provision of a plant for treating methane-containing gas from natural sources, which comprises:
a) at least one degassing module 1 and/or at least one trickle tower 10 and
b) at least one gas exchange module 2,
characterized in that the degassing module 1 and/or the trickle tower 10 and the gas exchange module 2 are connected in a water circuit and are arranged in series in the flow direction of the water 11, where the water 11 is degassed in the degassing module 1 and/or the trickle tower 10 and the degassed water takes up undesirable gases from the gas from natural sources which is fed in the gas exchange module 2 and where the gas from natural sources which is fed in is introduced into the at least one gas exchange module 2 in countercurrent to the degassed water.

The invention also achieves this object by provision of a process for treating methane-containing gas from natural sources, which comprises the steps:

a) degasification of water 11 in at least one degassing module 1 and/or at least one trickle tower 10 and b) gas exchange of the degassed water from step a) in at least one gas exchange module 2, with undesirable gases present in the gas from natural sources which is fed in going over from the gas phase of the gas from natural sources into the aqueous phase of the degassed water, characterized in that steps a) and b) are carried out in succession, where the degassing module 1 and/or the trickle tower 10 of step a) and the gas exchange module 2 of step b) are connected in a water circuit and are arranged in series in the flow direction of the water and the gas from natural sources is introduced into the at least one gas exchange module 2 in countercurrent to the degassed water.

The plant and the process of the invention having the features of the independent claims and preferably the dependent claims are characterized, in particular, by the series arrangement of the first step of degassing circulation water over a first membrane and/or in a trickle tower and the second step of gas exchange over a second membrane. This series arrangement of two gas exchange steps over two membranes or in a trickle tower and one gas-exchange membrane has not been described in the prior art. In a first step, water 11 is degassed by means of a first membrane in a degassing module 1 and/or trickle tower. In a second step, undesirable gases such as carbon dioxide ($CO_2$ and $H_2S$), are removed from the gas from natural sources with this degassed water over a second membrane in a gas exchange module 2.

The plant of the invention and the process of the invention for treating methane-containing gas from natural sources make it possible to increase the methane content of the gas from natural sources to concentrations of greater than 98%. Feeding the treated gas from natural sources into natural gas networks is thus made possible. A particular advantage of the plant of the invention is that treated gas from natural sources (methane gas) having a high purity can be made available, with the disadvantages of the above-described plants, for instance the use of refrigerants, bacteria and high pressures, as have been described at the outset for the processes known from the prior art, being avoided at the same time.

Further advantages of the plant of the invention are that it does without the use of chemicals and that it produces no waste products or wastewater. Furthermore, the plant can operate using low pressures, and the energy consumption of the plant is therefore comparatively low. The plant requires only water and electric energy and is also simple to operate and requires little maintenance.

DEFINITIONS

Some of the terms used in the context of the invention will firstly be defined more precisely.

The term "methane-containing gas from natural sources" encompasses any gas which is derived from natural sources and contains methane, in particular "natural gas" and "biogas". "Natural gas" is a combustible gas from natural sources which normally occurs in underground reservoirs, in particular in "natural gas traps" and/or is obtained as by-product in crude oil recovery. Furthermore, natural gas can be obtained from "unconventional" sources, which include, in particular, coal bed gases from coal beds, natural gas from aquifers, gas hydrate in rock and on the sea floor, "tight gas" in sandstone layers or shale gas, which can be accessed, inter alia, by horizontal wells and fracking. For the purposes of the invention, "biogas" is a gas which consists largely of methane ($CH_4$) and is produced by fermentation of biomass of any type. The methane content of biogas is usually 50-60%. Biogas can additionally contain large troublesome proportions of other gases, in particular carbon dioxide ($CO_2$) and hydrogen sulfide ($H_2S$). The remaining 40-50% are made up of such undesirable gases. For the purposes of the invention, the terms "raw biogas" and "untreated biogas" can be used as synonyms for "biogas".

For the purposes of the invention, the term "methane gas" refers to the treated methane-containing gas from natural sources, in particular natural gas and biogas, which is a product of the process of the invention. For the purposes of the invention, "methane gas" can have a methane content ($CH_4$) of preferably above 90% and particularly preferably above 95%. For the purposes of the invention, "methane gas" can have a methane content ($CH_4$) of above 96% and particularly preferably greater than 98%. For the purposes of the invention, the methane gas can be fed into the natural gas network. The terms "methane gas" and "treated gas from natural sources", "treated biogas" and "treated natural gas" can be used synonymously for the purposes of the invention. For the purposes of the invention, the "methane gas" can be additionally dried in a last step.

The term "stripping gas" is, for the purposes of the invention, used in connection with the degassing of water by means of a degassing module 1. During degassing, carbon dioxide ($CO_2$) and other gases dissolved in the water fed in are released together with the stripping gas into the surrounding air. Here, the gases dissolved in the water go from the aqueous phase into the gas phase of the air or into the gas phase of the stripping gas and are released together with this via a vacuum pump 6 into the surrounding air. For the purposes of the invention, the term "sweep gas" can be used as an alternative term for "stripping gas". The reference numeral 12 can denote stripping gas or vacuum.

The term "degassing module" is for the purposes of the invention used for a module which comprises a water-impermeable and gas-permeable membrane (semipermeable membrane) over which the transition of gases from the aqueous phase into the gas phase takes place. The transition of gases takes place in micropores of the membrane (microporous membrane). In general, the gas exchange over microporous membranes is referred to as "membrane absorption". For the purposes of the invention, the gas exchange is, in particular, the transition of, for example, carbon dioxide ($CO_2$) from the deionized water into the "stripping gas" 12, which can be filtered ambient air which has been drawn in, in step a) of the process of the invention. The degassing module can comprise a hollow fiber membrane. The degassing module can, for example, be the gas exchange module Liqui-Cel® from Membrana (Membrana, Charlotte, N.C., USA). For the purposes of the invention, the term "gas exchange module" can also be used instead of the terms "degassing module" and "hollow-fiber degassing module". The term "degassing module" relates, for the purposes of the invention, to the degassing module 1.

The term "gas exchange module" is for the purposes of the invention used for a module which comprises a water-impermeable and gas-permeable membrane (semipermeable membrane) at which the transition of gases from the gas phase into the aqueous phase takes place. The transition of gases takes place in micropores of the membrane (microporous membrane). In general, the gas exchange over microporous membranes is referred to as "membrane absorption". For the purposes of the invention, the gas exchange is, in particular, the transition of, for example, carbon dioxide ($CO_2$) and hydrogen sulfide ($H_2S$) from the methane-containing gas from natural sources which is fed in into the deionized and degassed water from step a) in step b) of the process of the invention. The gas exchange module can have a hollow fiber membrane or a hollow-fiber degassing membrane. The gas exchange module can be, for example, the gas exchange module Liqui-Cel® from Membrana (Membrana, Charlotte, N.C., USA). For the purposes of the invention, the terms "gas exchange module" and "hollow-fiber degassing module" can be used synonymously. For the purposes of the invention, the term "gas exchange module" relates to the gas exchange module 2. In general, the gas exchange over microporous membranes is referred to as membrane absorption.

The term "semipermeable" membrane refers, for the purposes of the invention, to a water-impermeable and gas-permeable membrane over which the transition of gases from the aqueous phase into the gas phase takes place. The semipermeable membrane has micropores (microporous membrane), with the transition of gases dissolved in the water into the gas phase on the other side of the membrane taking place in the micropores. This principle is depicted in FIG. 1. For the purposes of the invention, the semipermeable membrane can be in the form of a hollow fiber membrane.

For the purposes of the invention, the term "undesirable gas" refers to a gas which decreases the purity of the methane-containing gas from natural sources, i.e. reduces the methane content of the gas from natural sources. Examples of "undesirable gases" are carbon dioxide ($CO_2$) and hydrogen sulfide ($H_2S$), but the undesirable gases can also be other gases which are different from methane. The process of the invention removes these undesirable gases from the methane-containing gas from natural sources, giving methane gas having an increased methane content (treated gas from natural sources).

FIGURES AND TABLES

FIG. 1: The water 11 contains gas dissolved from the atmosphere (here, for example, $O_2$, oxygen) which is present in a partial pressure equilibrium with the surrounding atmosphere. This means that the water 11 is saturated with gas. If a vacuum is applied in the hollow fiber, the partial pressure gradient is shifted and the gas dissolved in the water 11 (here X $O_2$) is given off into the vacuum in gaseous form (here gaseous y $O_2$). In this process, the gas passes from the phase dissolved in the water 11 on the one side of the membrane (X $O_2$, shown at left) through the micropores (shown with hatched lines) of the semipermeable membrane into the gas phase (y $O_2$). The partial pressure gradient into the vacuum is additionally increased when a stripping gas 12 (or "sweep gas"), e.g. nitrogen, is used on the vacuum side.

FIG. 2 shows the basic principle of the plant of the invention and the process of the invention. An embodiment of the plant of the invention for treating methane-containing gas from natural sources, which comprises the components degassing module 1, gas exchange module 2, water tank 3, circulation pump 4, air filter 5 and vacuum pump 6, is shown.

FIG. 3 shows a further embodiment of the plant of the invention having the additional components apparatus for desulfurization 7 (e.g. an activated carbon filter), condenser for drying 8 (methane gas drying) and compressor 9 (compressor for gas from natural sources).

Figure 1:
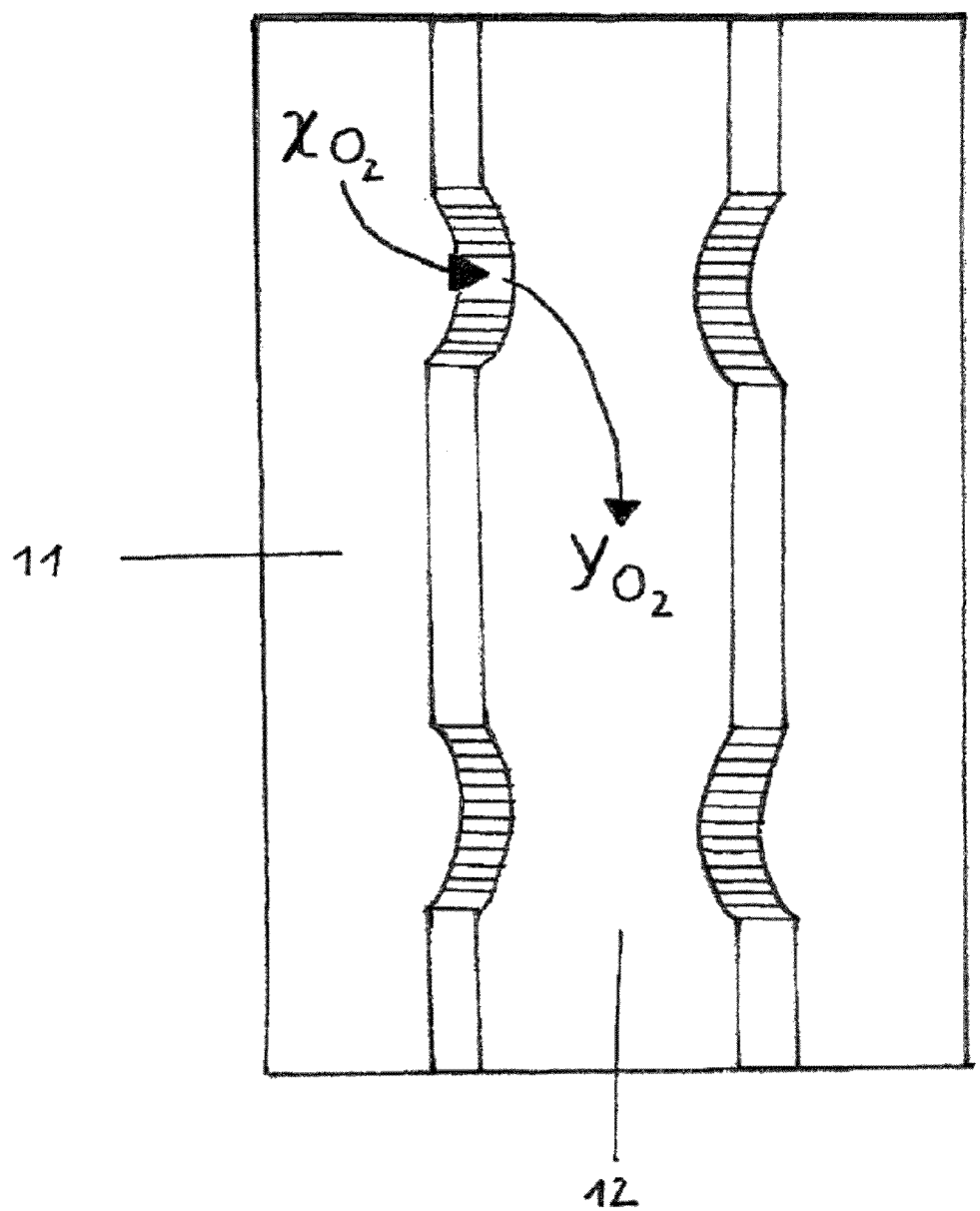

Table 1: The table lists measured values for the parameters pressure, throughput, conductivity, pH, methane gas content, temperature and water hardness.

Table 2: Measurement results for the experiment of example 1, shown in FIG. 5.

Table 3: Measurement results for the experiment of example 2, shown in FIG. 6.

Table 4: The operating parameters of the experiments of examples 1 and 2 are shown.

The invention is described in more detail below.

The plant of the invention and the process of the invention are used to remove undesirable gases which reduce the joule value of methane-containing gas from natural sources from said gas. The plant of the invention and the process of the invention can, in particular, remove the undesirable gases carbon dioxide ($CO_2$) and hydrogen sulfide ($H_2S$) from the methane-containing gas from natural sources. As a result, the methane gas content ($CH_4$) of the gas from natural sources is increased. However, the process can equally well remove other undesirable gases which are different from methane and decrease the methane content of the gas from natural sources and thus reduce the joule value of the gas from natural sources from the gas from natural sources.

In a first embodiment, the plant comprises two membranes arranged in series, where the first membrane is located in a degassing module 1 and the second membrane is located in a gas exchange module 2. The steps of degassing of circulation water 11 over a first membrane in the degassing module 1 and of gas exchange over a second membrane in the gas exchange module 2 are arranged in series. In a first step, water 11 is degassed by means of the first membrane. In a second step, this degassed water is used, over the second membrane, to remove undesirable gases, for example carbon dioxide ($CO_2$) and hydrogen sulfide ($H_2S$), from the methane-containing gas from natural sources. In a second embodiment of the invention, the degassing module 1 having the first membrane is replaced by a trickle tower 10.

The invention provides a plant for treating methane-containing gas from natural sources, which comprises:
a) at least one degassing module 1 and/or at least one trickle tower 10 and
b) at least one gas exchange module 2,
wherein the degassing module 1 and/or the trickle tower 10 and the gas exchange module 2 are connected in a water circuit and are arranged in series in the flow direction of the water 11, where the water 11 is degassed in the degassing module 1 and/or the trickle tower and the degassed water takes up undesirable gases from the methane-containing gas from natural sources which is fed in the gas exchange module 2 and where the gas from natural sources which is fed in is introduced into the at least one gas exchange module 2 in countercurrent to the degassed water.

The mode of operation of the plant of the invention will be described in more detail below. The water 11 used in the plant contains gases dissolved from the atmosphere which are in a partial pressure equilibrium with the surrounding air. This means that the water 11 is saturated with gas.

For a first degassing step a), water 11 is pumped by means of a circulation pump 4 to the degassing module 1 and/or the trickle tower. The water 11 is preferably softened or deionized beforehand, which can take place in a deionization plant installed upstream of the degassing module 1 or in a softening or deionization stage installed upstream of the plant of the invention.

The water 11 enters the degassing module 1 via a connection and flows through the module, remaining on one side of a water-impermeable membrane. In parallel thereto, air or a stripping gas, for example nitrogen, is conveyed by means of a vacuum pump 6 via a second connection of the degassing module 1 through the degassing module 1 in countercurrent to the water, with the air or the stripping gas being conveyed along the other side of the water-impermeable membrane. The membrane in the degassing module 1 is water-impermeable and gas-permeable, with the gas permeability of the membrane being ensured by micropores. The membrane is preferably a hollow fiber membrane. The transition of gases dissolved in the water through the membrane into the generated vacuum or the stripping gas 12 takes place at the boundary formed by the membrane between water on the one side of the membrane and air or stripping gas 12 on the other side of the membrane. Here, the gases dissolved in the water 11 follow the partial pressure gradient and escape into the vacuum or into the stripping gas 12. Here, the gases dissolved in the water 11, for example carbon dioxide ($CO_2$), and oxygen ($O_2$), go over into the gas phase at the membrane and go in gaseous form into the generated vacuum or into the stripping gas.

The partial pressure gradient into the vacuum can be additionally increased by using a stripping gas 12, e.g. nitrogen, on the vacuum side. This principle is depicted in FIG. 1.

As an alternative to or in addition to the degassing module 1, the water can be degassed by means of a trickle tower 10.

The degassed water, which has preferably been softened or deionized, leaves the degassing module 1 or the trickle tower 10 via an outlet of the degassing module 1 or a corresponding outlet of the trickle tower 10 and is pumped by the circulation pump 4 to the gas exchange module 2. The distance over which this occurs does not have to be long, since the gas exchange module 2 can directly adjoin the degassing module 1 or the trickle tower 10. However, the gas exchange module 2 can also be further removed from the degassing module 1, e.g. in a separate room, as a result of which better explosion protection can be achieved.

The water which has been degassed in the degassing module 1 or trickle tower 10 and has preferably been softened or deionized enters the gas exchange module 2 via a connection and flows through the module, remaining on one side of a water-impermeable membrane. In parallel thereto, methane-containing gas from natural sources which is to be treated is conveyed via a second connection of the gas exchange module 2 through the gas exchange module 2 in countercurrent to the degassed water, with the gas from natural sources being conveyed along the other side of the water-impermeable membrane. The membrane in the gas exchange module 2 is water-impermeable and gas-permeable. The membrane in the gas exchange module 2 is preferably a hollow fiber membrane.

The transition of undesirable gases present in the gas from natural sources through the membrane into the degassed water takes place at the boundary formed by the membrane in the gas exchange module 2 between degassed water on the one side of the membrane and methane-containing gas from natural sources which is to be treated on the other side of the membrane. Here, the undesirable gases present in the methane-containing gas from natural sources which is to be treated, for example carbon dioxide ($CO_2$) or hydrogen sulfide ($H_2S$), largely go over into the degassed and preferably deionized water at the membrane. This results in treated or enriched gas from natural sources having an increased methane content, for the purposes of the invention also referred to as methane gas, which leaves the gas exchange module 2 via an outlet. The methane gas obtained in this way can have a methane content of greater than 98% and can thus be most suitable for feeding into the natural gas network.

The gas exchange over the membrane of the degassing module 1 and over the membrane of the gas exchange module 2 exploits the natural ability of water to take up gases selectively from the surroundings and release them again into the surroundings. The uptake capacity of water for various gases is dependent on the salt content of the circulation water, the partial pressure of the respective gas on the two sides of the phase boundary and the temperature of the circulation water. The mass transfer can be influenced by the process-engineering parameters flow ratios at the phase boundary, size of the exchange area and the concentration gradient of the gas at the phase boundary. In the case of carbon dioxide ($CO_2$), the chemistry of the inorganic carbon compounds in the water (lime-carbonic acid equilibrium) additionally has to be taken into account. For this reason, the parameters pH and the concentration of alkaline earth metals in the circulation water (water hardness) can also have an influence on the gas exchange over the membrane of the degassing module 1 and over the membrane of the gas exchange module 2.

The water containing the undesirable gases taken up and dissolved from the methane-containing gas from natural sources leaves the gas exchange module 2 via an outlet and can be recirculated in the form of a circuit by means of a circulation pump 4 to the degassing module 1 and/or the trickle tower 10 for a further degassing step, with a fresh cycle of degassing of the water and subsequent methane-enrichment of the gas from natural sources being able to commence in the gas exchange module 2.

In preferred embodiments of the invention, the plant can have precisely one degassing module 1 or one trickle tower 10 and precisely one gas exchange module 2. However, the plant can also have more than one degassing module 1 or one trickle tower 10 and one gas exchange module 2.

The at least one degassing module 1 and the at least one gas exchange module 2 can each comprise a water-impermeable and gas-permeable membrane which is preferably a hollow-fiber degassing membrane. The degassing module 1 can have connections for air or stripping gas or the vacuum, with air or stripping gas entering the degassing module 1 via a connection and leaving the degassing module 1 again via a further connection in the direction of the vacuum. The degassing module 1 can have two further connections, namely an inlet for the water and an outlet for the degassed water. The inlet of the gas exchange module 2 can directly adjoin the latter outlet. In other embodiments of the plant of the invention, the degassed water can leave the degassing module 1 via the outlet and be conveyed over a relatively long distance via a circulation pump 4 to the gas exchange module 2 which can be located, for example, in another, separate room, giving better explosion protection. The gas exchange module 2 can have a connection (inlet) for the inflowing degassed circulation water and an outlet for the exiting circulation water which has taken up the undesirable gases from the methane-containing gas from natural sources which is to be treated.

The gas exchange module 2 can additionally have an inlet for the methane-containing gas from natural sources which is to be treated and an outlet for the exiting methane gas which has a higher methane content than the gas from natural sources.

In an embodiment of the invention, the degassing module 1 or the gas exchange module 2 can be the Liqui-Cel® gas exchange module from Membrana (Membrana, Charlotte, N.C., USA).

The plant of the invention can further comprise at least one water tank 3 which is arranged upstream of the degassing module 1 and provides water for the water circuit.

The water 11 is preferably deionized before entering the degassing module 1 or the trickle tower 10, or before storage in the water tank 3. The deionization of the water 11 can preferably be carried out in a mobile deionization plant. The deionization plant can be installed upstream of the degassing module 1 or the trickle tower 10 or the water tank 3. The deionization or softening of the water can also be carried out in a stationary softening or deionization plant which is integrated in a fixed manner into the plant. The water does not necessarily have to be collected in the water tank 3 after softening or deionization in the deionization plant. The deionized or softened water can, after the softening or deionization plant, also be fed directly to the degassing module 1 or the trickle tower 10 and thus be supplied to the circuit directly without storage in the water tank 3.

The plant can further comprise at least one vacuum pump 6 which applies a vacuum to the degassing module 1. The plant can also have two or more vacuum pumps 6.

The plant can further comprise at least one apparatus for desulfurization 7 which can be arranged upstream of the gas exchange module 2. The methane-containing gas of natural origin which is to be treated can be desulfurized by means of this apparatus before entering the gas exchange module 2. The apparatus for desulfurization 7 is preferably an activated carbon filter which can, for example, filter hydrogen sulfide ($H_2S$) out from the gas from natural sources which is to be treated.

The plant can further comprise at least one condenser for drying 8 the gas from natural sources which is to be treated before the methane-containing gas from natural sources enters the gas exchange module 2. In this way, dried gas from natural sources can be fed into the gas exchange module 2. The condenser for drying 8 is preferably arranged upstream of the apparatus for desulfurization 7.

The plant can further comprise at least one compressor 9 which compresses the methane-containing gas from natural sources which is to be treated and is preferably arranged upstream of the gas exchange module and is preferably operationally connected to an instrument for measuring the pressure or the throughput of the gas from natural sources. The compressor 9 can be located between the apparatus for desulfurization 7 and the inlet into the gas exchange module 2. In this way, desulfurized and compressed methane-containing gas from natural sources which is to be treated can be fed into the gas exchange module 2. In particular embodiments of the invention, the plant can have two or more compressors 9, with at least one additional compressor being able to be arranged upstream of the gas exchange module 2.

In a further embodiment of the plant of the invention, at least one further condenser for drying 8 can be installed downstream of the outlet for the treated gas from natural sources (methane gas) from the gas exchange module 2, by means of which the methane gas leaving the gas exchange module 2 is dried and can leave the plant as dried methane gas.

The plant can additionally comprise one or more measuring instruments, e.g. an instrument for measuring the water pressure, an instrument for measuring the pressure of stripping gas or biogas, a pH measuring instrument, temperature measuring instrument, measuring instrument for conductivity of the water and measuring instrument for determining the hardness of the water. The plant can in each case comprise one or more of these types of measuring instruments. For example, the compressor 9 can be operationally connected to an instrument for measuring the pressure of the methane-containing gas from natural sources, preferably upstream of the inlet for the gas from natural sources to be treated into the gas exchange module 2.

The at least one degassing module 1 and/or the trickle tower 10 and the at least one gas exchange module 2 of the plant of the invention can be physically separate. This means that the degassing module 1 and/or the trickle tower 10 and the gas exchange module 2 can be located in different rooms. This concept is referred to as "explosion protection" and serves to protect against explosion in regions subject to an explosion hazard (explosion protection in accordance with ATEX product directive 94/9/EC). Here, the gas exchange module 2 which comes into contact with the methane-containing gas from natural sources can be located in a separate room in order to offer protection against explosions. The circulation pump 4, the compressor 9 and the measuring instruments can be located in another room in which there is no "explosion protection" zone and do not have to be configured as ATEX instruments, so that no particular precautions have to be taken during maintenance work.

In a further embodiment of the plant of the invention, at least one trickle tower 10 which additionally removes gases dissolved in the water before degassing of the water 11 in the degassing module 1 can be installed upstream of the at least one degassing module 1.

The invention further provides for the use of the above-described plant for treating methane-containing gas from natural sources.

The invention further provides a process for treating methane-containing gas from natural sources, which comprises the steps:

a) degasification of water 11 in at least one degassing module 1 and/or a trickle tower 10 and b) gas exchange of the degassed water 11 from step a) in at least one gas exchange module 2, with undesirable gases present in the methane-containing gas from natural sources which is fed in going over from the gas phase of the gas from natural sources into the aqueous phase of the degassed water, characterized in that steps a) and b) are carried out in succession, where the degassing module 1 and/or the trickle tower 10 of step a) and the gas exchange module 2 of step b) are connected in a water circuit and are arranged in series in the flow direction of the water 11 and where the methane-containing gas from natural sources is introduced into the at least one gas exchange module (2) in countercurrent to the degassed water.

The process of the invention for treating methane-containing gas from natural sources comprises two process steps, with water 11 being degassed by means of at least one degassing module 1 and/or a trickle tower in a first step a). The water used in the plant contains gases dissolved from the atmosphere which are in a partial pressure equilibrium with the surrounding air. This means that the water is saturated with gas. For the first degassing step a), water is pumped by means of a circulation pump 4 to the degassing module 1. As an alternative, water degassed by means of a trickle tower can be used. The water is preferably softened or deionized beforehand, which can occur in an upstream softening or deionization plant.

Undesirable gases such as carbon dioxide ($CO_2$) and hydrogen sulfide ($H_2S$) are removed from the methane-containing gas from natural sources by means of this degassed water in a second step b) via the gas exchange module 2. This gives treated gas from natural sources which has an increased methane content ($CH_4$).

In the process of the invention, the water 11 can be deionized before step a), with the conductivity of the deionized water being able to be less than 500 µS/cm, preferably less than 400 µS/cm, more preferably less than 300 µS/cm, more preferably less than 200 µS/cm, more preferably less than 100 µS/cm, more preferably less than 50 µS/cm and more preferably less than 10 µS/cm.

In the process of the invention, the hardness of the deionized water can be less than 0.2° dH, preferably less than 0.1° dH and particularly preferably less than 0.05° dH.

The undesirable gases removed from the methane-containing gas from natural sources in step b) of the process of the invention can be hydrogen sulfide ($H_2S$) and carbon dioxide ($CO_2$). However, it is also possible to remove any other types of undesirable gases which are different from methane and can decrease the methane content of the gas from natural sources and thus reduce its purity.

The methane content of the treated gas from natural sources after step b) of the process of the invention can be greater than 80%, preferably greater than 85%, more preferably greater than 90%, particularly preferably greater than 95%. In a particularly preferred embodiment, the methane content of the treated gas from natural sources after step b) can be greater than 98%.

In the process of the invention, the methane-containing gas from natural sources which is to be treated can be desulfurized before entering the gas exchange module 2 in step b). The additional process step of desulfurization of the gas from natural sources can preferably be carried out using at least one apparatus for desulfurization 7 which is located upstream of the gas exchange module 2. The at least one apparatus for desulfurization 7 can be an activated carbon filter which can filter, for example, hydrogen sulfide ($H_2S$) out from the methane-containing gas from natural sources.

In addition, the methane-containing gas from natural sources which is to be treated can be dried before entering the gas exchange module 2. The additional process step of drying of the gas from natural sources can preferably be carried out using at least one condenser for drying 8. In this way, desulfurized and dried gas from natural sources can be fed to the gas exchange module 2.

In a further embodiment of the process of the invention, the methane-containing gas from natural sources can be compressed by means of at least one compressor 9 before entering the gas exchange module 2 in step b). The compressor 9 can be located upstream of the gas exchange module 2. The combined action of the components apparatus for desulfurization 7, condenser for drying 8 and compressor 9 makes it possible to feed dried, desulfurized and compressed gas from natural sources which is to be treated to the gas exchange module 2 for carrying out step b) of the process.

In the process of the invention, the steps a) degassing of the water 11 and b) gas exchange of the degassed water can be carried out physically separately. This means that the at least one degassing module 1 and/or the at least one trickle tower 10 and the at least one gas exchange module 2 of the plant of the invention can be located in different rooms. This concept is referred to as "explosion protection" (explosion protection in accordance with ATEX product directive 94/9/EC). Here, the gas exchange module 2 which comes into contact with the methane-containing gas from natural sources can be located in a separate room. The pumps, the compressor and the measuring instruments can be located in another room in which there is no "explosion protection" zone and do not have to be configured as ATEX instruments, so that no particular precautions have to be taken during maintenance work.

The process of the invention can be carried out in the plant of the invention as described herein.

In a further embodiment of the process of the invention, the degassing of the water 11 in at least one degassing module 1 in step a) can be preceded by an additional degassing step in at least one trickle tower 10 which additionally removes gases dissolved in the water before degassing of the water 11 in the degassing module 1. As an alternative, the degassing can be carried out in a trickle tower 10 which is located upstream of the circulation pump 4.

The plant of the invention and the process of the invention for treating methane-containing gas from natural sources will be described in more detail below.

Degassing Module 1 and Step a): Degassing of Water in at Least One Degassing Module 1 or a Trickle Tower 10

The water 11 which is low in salts or has been deionized which is used can be taken from the water tank 3 for degassing in step a) and fed to the degassing module 1 by means of a circulation pump 4. The plant of the invention can therefore have at least one circulation pump 4.

The water 11 which is low in salts or has been deionized which is used can, for the purpose of degassing in step a), be taken from the water tank 3 which is preceded by a trickle tower 1 and be conveyed by means of a circulation pump 4. The plant of the invention can therefore have at least one circulation pump 4.

The hardness of the water 11 used in step a) can be in the range less than 0.2° dH. The residual hardness can preferably be below 0.1° dH. The residual hardness can particularly preferably be less than 0.05° dH.

The conductivity of the water 11 which is low in salts and is used in step a) can be less than 500 µS/cm and the conductivity can preferably be less than 400 µS/cm; the residual hardness can particularly preferably be less than 300 µS/cm. However, the conductivity of the water 11 which is low in salts or has been deionized can also be less than 200 µS/cm, less than 100 µS/cm, or less than 10 µS/cm.

In a preferred embodiment of the apparatus of the invention and of the process of the invention, water which is low in salts and has a residual hardness of less than 0.05° dH and a conductivity of less than 300 µS/cm is used in step a).

In the degassing module 1, undesirable gases such as carbon dioxide ($CO_2$) and hydrogen sulfide ($H_2S$) dissolved in the introduced water which is low in salts are very largely removed under vacuum by means of a stripping gas. The stripping gas can, for example, be filtered ambient air. However, the stripping gas can also be nitrogen. For this purpose, the plant of the invention can have at least one air filter 5 and at least one vacuum pump 6 on the degassing module 1. Here, the vacuum pump 6 on the degassing module 1 can generate a vacuum and thus draw in ambient air, which is conveyed through the degassing module 1, through the air filter 5. The filtered ambient air can preferably be conveyed in countercurrent through the degassing module 1.

Figure 2:
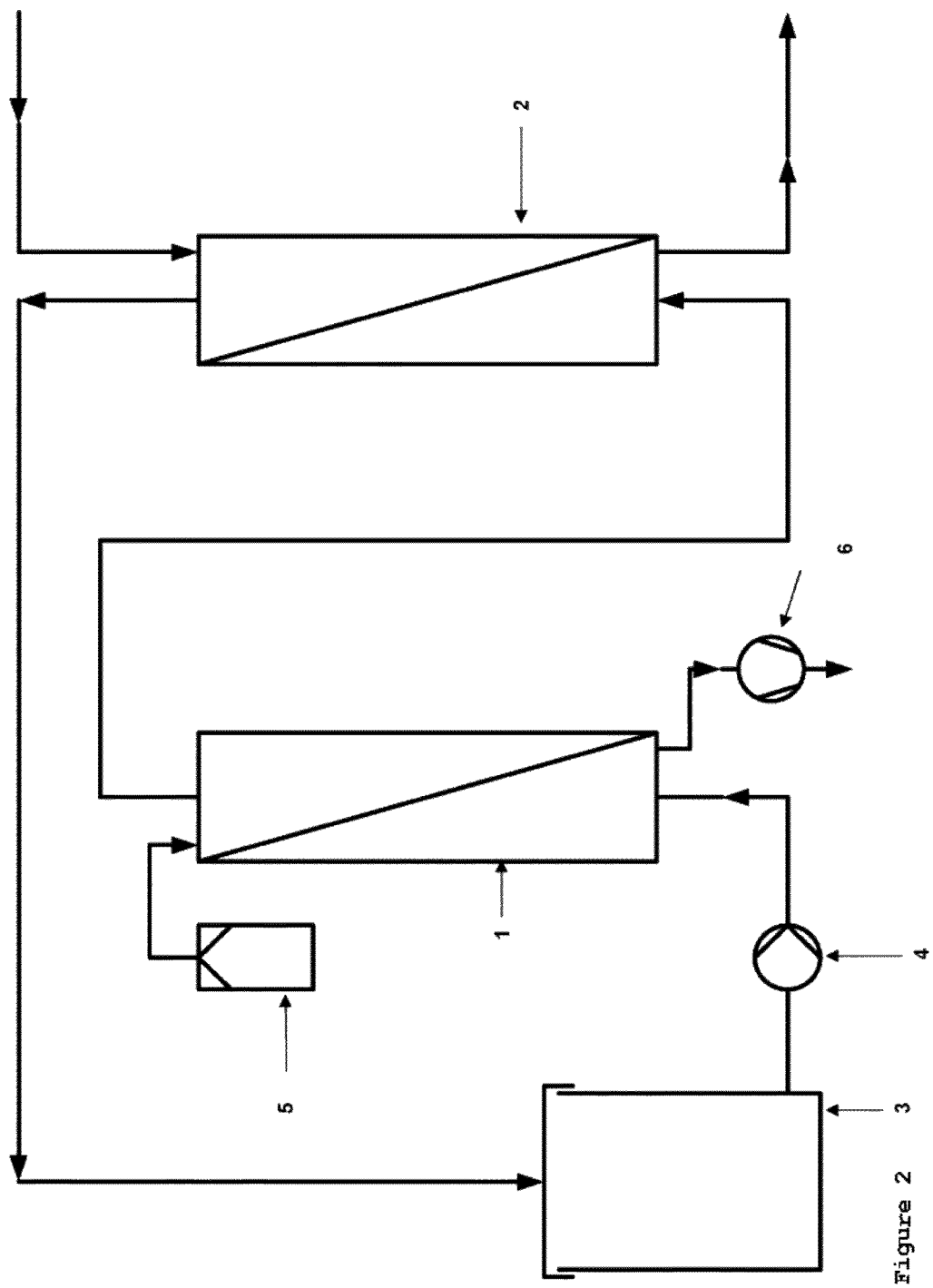
Figure 3:
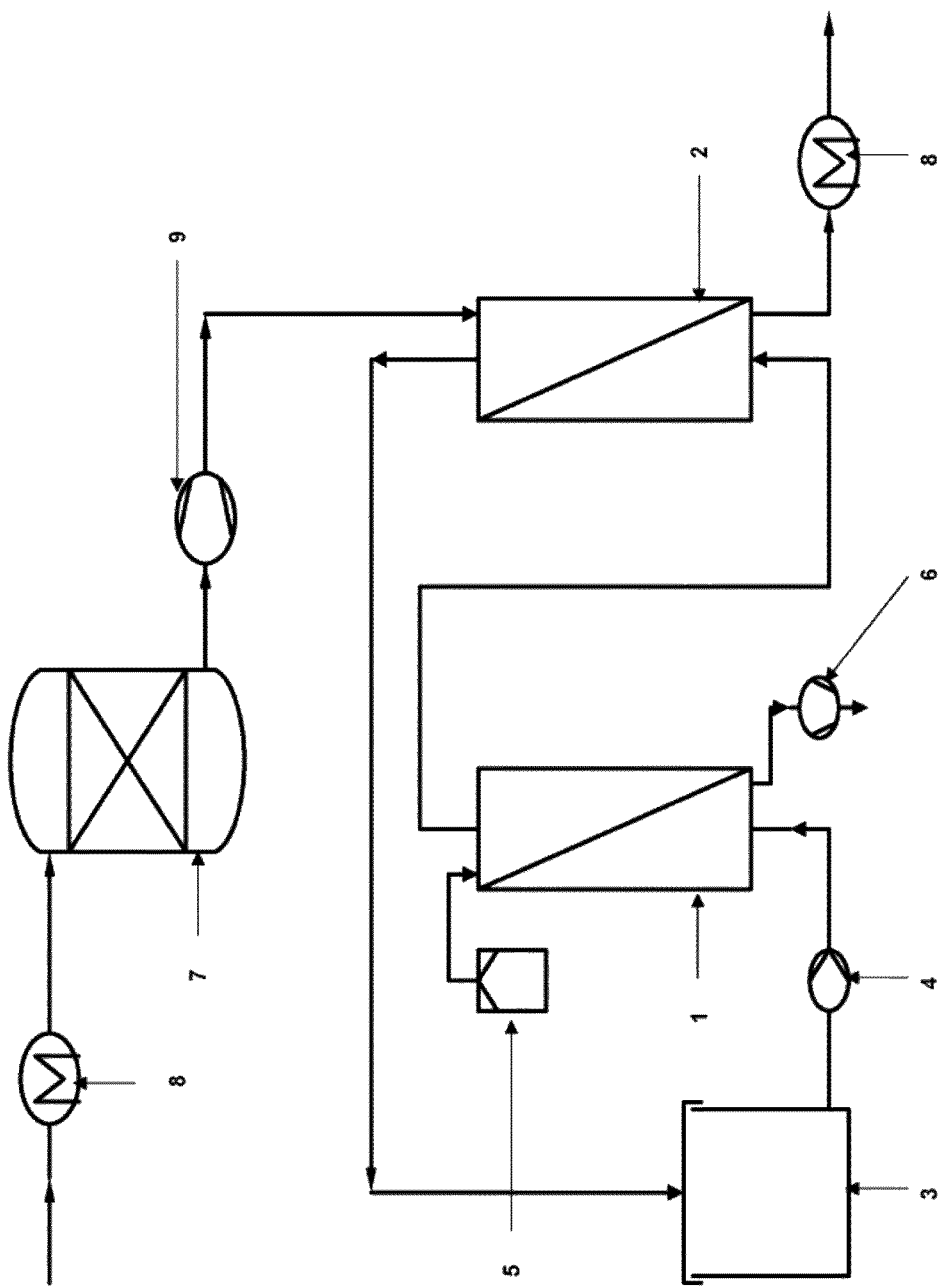
Figure 4:
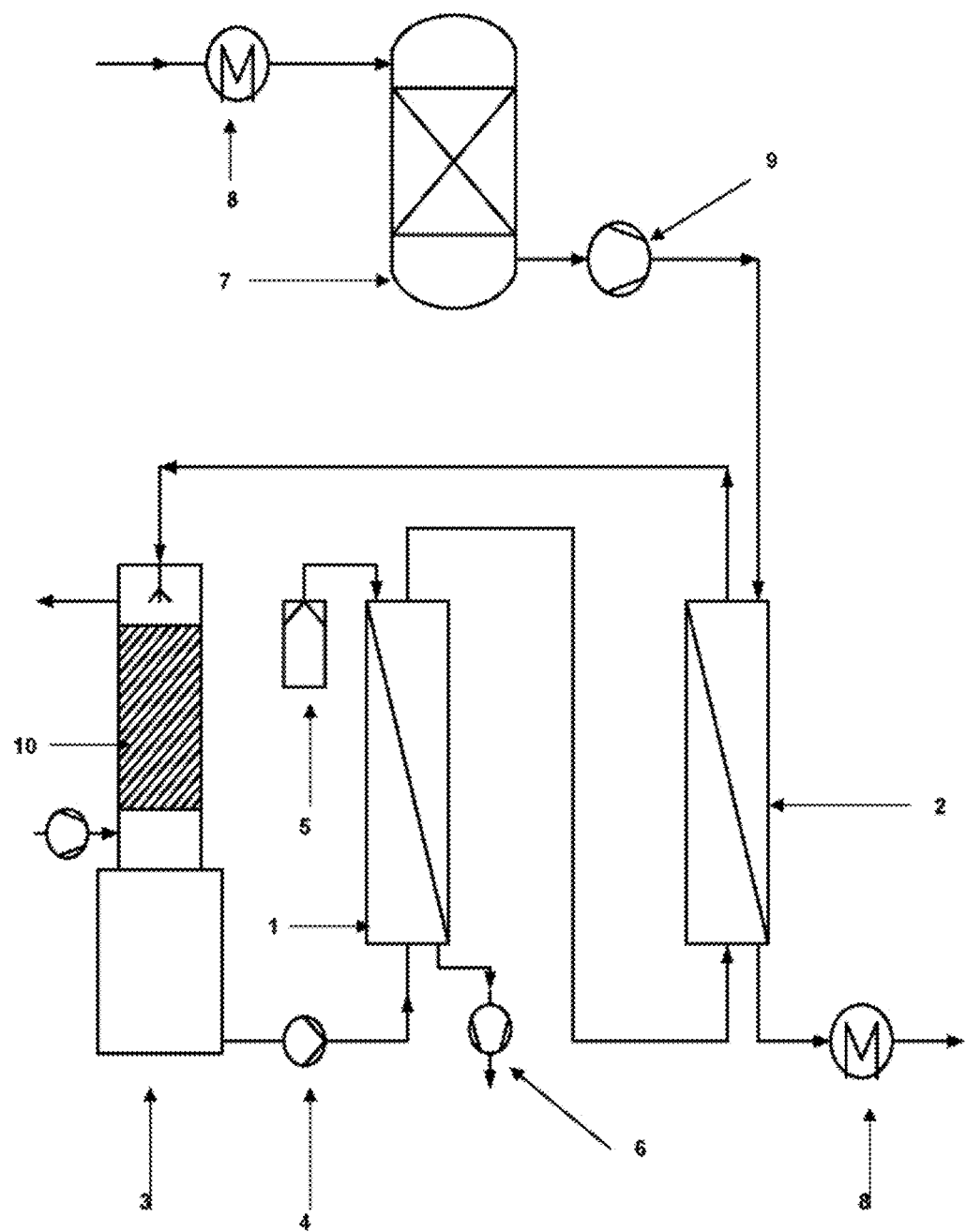
FIG. 4 shows a further embodiment of the plant of the invention with the additional component trickle tower 10, which is located upstream of the degassing module 1.

An example of a degassing module 1 which can be used in step a) is shown in FIGS. 2-4.

In the process of the invention, a vacuum, which can preferably be generated by means of a vacuum pump 6, can be applied to the degassing module 1 in step a) degassing of the water 11 which is low in salts or has been deionized, as indicated above for the plant. A "stripping gas" 12 can be conveyed through the degassing module 1 in countercurrent direction to the introduced water which is low in salts or has been deionized. In preferred embodiments, the "stripping gas" 12 is taken from the surrounding air which can be purified beforehand by means of at least one air filter 5. During degassing, carbon dioxide ($CO_2$) and other gases dissolved in the water 11 fed in are released together with the stripping gas 12 into the surrounding air. The gases dissolved in the water 11 go from the aqueous phase into the gas phase of the air ("stripping gas" 12) and are released together with the latter via a vacuum pump 6 into the surrounding air.

During degassing in step a), the stripping gas 12 can be passed through the hollow fiber membrane of the degassing module 1 while the water 11 fed in is passed in countercurrent direction over the membrane. Here, gas exchange can take place via gas-permeable micropores of the hollow fiber membrane.

The degassed water from the degassing module 1 of the plant and step a) of the process is then passed on to the at least one gas exchange module 2 of the plant or to step b) of the process of the invention, with the quality of purification (degassing) and the functionality of the degassing module 1 being able to be monitored by means of a conductivity measurement and a measurement of the pH. The plant can have the measuring instruments necessary for this purpose.

Gas Exchange Module 2 and Step b): Gas Exchange in at Least One Gas Exchange Module 2

The water 11 which has been degassed in step a) and leaves the degassing module 1 via an outlet is subsequently fed into the gas exchange module 2 for step b). In a preferred embodiment, the gas exchange module 2 comprises a hollow fiber membrane. The gas exchange module used in step b) can be the gas exchange module Liqui-Cel® from Membrana (Membrana, Charlotte, N.C., USA).

The water 11 which has been degassed in step a) enters the gas exchange module 2 via a connection and remains on one side of a water-impermeable, gas-permeable membrane, as already described above for the plant. The methane-containing gas from natural sources which is to be treated is conveyed via a further connection through the degassing module 2 in countercurrent to the degassed water 11, with the gas from natural sources remaining on the other side of the membrane. Here, undesirable gases present in the gas from natural sources go over into the degassed water via the micropores of the membrane. The purified gas from natural sources (methane gas) then leaves the gas exchange module 2 via an outlet. After leaving the gas exchange module 2, the purified gas from natural sources (methane gas) can be dried in a further process step, for example by means of a further condenser for drying 8 which can be located downstream of the gas exchange module 2.

In a preferred embodiment, the methane-containing gas from natural sources which is to be treated can be fed in filtered and dried form into the gas exchange module 2. In a particularly preferred embodiment, the gas from natural sources which is fed in can be fed in filtered, dried and compressed form into the gas exchange module 2. For this purpose, at least one condenser for drying and at least one apparatus for desulfurization 7 and/or at least one compressor 9 can be located upstream of the gas exchange module 2. The apparatus for desulfurization 7 can be an activated carbon filter. The methane-containing gas from natural sources which is to be treated can be largely freed of hydrogen sulfide ($H_2S$), for example by means of an activated carbon filter, by means of the apparatus for desulfurization 7 and then be dried by means of a condenser for drying 8. For this purpose, at least one activated carbon filter for desulfurization and at least one condenser for drying can be installed upstream of the gas exchange module b). In addition, a compressor 9 can be installed upstream.

The methane-containing gas from natural sources which is to be treated can be conveyed at a gauge pressure of from 50 mbar to 1000 mbar through the gas exchange module 2 in countercurrent to the water. In a preferred embodiment, the gauge pressure of the gas from natural sources can be in the range from 50 mbar to 500 mbar. In preferred embodiments of the invention, the gauge pressure of the gas from natural sources can be in the range from 50 mbar to 400 mbar. In particularly preferred embodiments of the invention, the gauge pressure of the gas from natural sources can be in the range from 100 mbar to 400 mbar. In particularly preferred embodiments of the invention, the gauge pressure of the gas from natural sources can be in the range from 100 mbar to 200 mbar.

An example of a degassing module 1 or a gas exchange module 2 is shown in FIGS. 2-4. In an embodiment of the invention, the degassing module 1 and the gas exchange module 2 can each comprise a hollow fiber membrane. Both the degassing module 1 and the gas exchange module 2 can be the gas exchange module Liqui-Cel® from Membrana (Membrana, Charlotte, N.C., USA). However, in other embodiments of the invention, the degassing module 1 and the gas exchange module 2 can be of other types.

The water circuit in the plant of the invention can be operated at a pressure of 1 bar. However, the water circuit can, for the purposes of the invention, also be operated at pressures above or below 1 bar.

In step b) of the process of the invention, over 80% of the readily water-soluble carbon dioxide ($CO_2$) and hydrogen sulfide ($H_2S$) can be taken up in the gas exchange module 2 from the methane-containing gas from natural sources which is to be treated by the circulation water which has been degassed in step a) and thus removed from the gas phase. Preferably above 85%, more preferably above 90%, particularly preferably above 95%, of the readily water-soluble carbon dioxide ($CO_2$) and hydrogen sulfide ($H_2S$) can be removed from the gas from natural sources. This gives the product of the process of the invention, viz. treated gas from natural sources or methane gas. In a particularly preferred embodiment of the invention, the treated gas from natural sources (methane gas) can have a methane content of more than 98%.

In step b) of the process of the invention, the undesirable gases, for example carbon dioxide ($CO_2$) and hydrogen sulfide ($H_2S$), dissolved in the methane-containing gas from natural sources which is to be treated go over from the gas phase of the biogas into the aqueous phase of the water which has been degassed in step a).

The partial pressure of the methane fraction in the gas from natural sources ($CH_4$) (or in the "raw biogas", "untreated biogas", or "untreated natural gas" or "raw natural gas") is greater than the water pressure in the circulation system of the plant of the invention. The methane fraction ($CH_4$) present in the gas from natural sources therefore does not go, or goes in only very small amounts, into a solution and remains in the gas phase as "methane gas".

The methane content ($CH_4$) of the gas from natural sources can be monitored continuously by means of an on-line measurement in the process of the invention. The plant of the invention can have the measuring instruments necessary for this.

In the process of the invention, treated methane-containing gas from natural sources having a methane concentration ($CH_4$) of greater than 80%, preferably greater than 85%, more preferably greater than 90%, particularly preferably greater than 95%, can be obtained after the gas exchange in step b). In a particularly preferred embodiment of the process of the invention, gas from natural sources having a methane concentration ($CH_4$) of greater than 98% is obtained after step b). In a very particularly preferred embodiment of the process of the invention, gas from natural sources having a methane concentration ($CH_4$) of more than 98% is obtained after step b). The treated gas from natural sources (methane gas) obtained is, due to its gas composition, suitable for feeding into the natural gas network, with any odorization steps which are still required, i.e. the addition of odorous substances to the gas, and increasing the pressure being able to be carried out in addition, which is usually among the tasks of the gas network operator or partners thereof.

After carrying out step b), the water containing the undesirable gases, for example hydrogen sulfide ($H_2S$) and carbon dioxide ($CO_2$), taken up from the methane-containing gas from natural sources can be recirculated directly to the degassing module 2 for a further step a) or can firstly be introduced into the water tank 3. In this way, the water can be circulated in the plant. The plant of the invention and the process of the invention therefore save water and energy.

Apart from carbon dioxide ($CO_2$), it is also possible to remove hydrogen sulfide ($H_2S$) from the methane-containing gas from natural sources by means of this process. Both gases are in the context of the invention designated as "undesirable gases", i.e. gases which can adversely affect the purity of the gas from natural sources. For the removal of hydrogen sulfide ($H_2S$), the plant can have the measurement facilities necessary for this purpose in order then to be used in the process.

The plant of the invention and the process of the invention have a number of technical advantages. For example, the process can dispense with the use of chemicals. The process can thus be carried out without the addition of chemicals. A further technical advantage of the plant of the invention and of the process of the invention is that carrying out the treatment of the methane-containing gas from natural sources forms no waste materials or waste water. The plant and the process are therefore environmentally friendly and save costs. A further technical advantage of the plant of the invention and of the process of the invention is that the plant and the process can be operated at low pressures and the energy requirement is therefore comparatively low. The plant and the process require only water and electric energy and are therefore environmentally friendly and save costs. In addition, the plant of the invention is simple to operate and requires little maintenance.

In addition, the invention makes use of the fact that the additional process step of deionization or softening of the circulation water upstream of the degassing module 1 and step a) increases the solubility of gases in the deionized water. The solubility of gases in water is increased when hardness or salts in general are removed from the water. The use of softened water which is low in salts or has been deionized is of great importance for the efficiency of the apparatus of the invention and of the process of the invention. Because the softened water which is low in salts or has been deionized is circulated in the apparatus and, as a result, is introduced into a water tank 3 only when the plant is started up, the water can be deionized using a small mobile water treatment unit. This component or this step can precede the degassing module 1 and/or trickle tower 10 or step a). The possibility of using a small, mobile plant for deionization or softening of the water upstream of the degassing module 1 and/or trickle tower 10 and preferably upstream of the water tank 3 of the plant or before step a) of the process of the invention, is a further advantage of the invention.

Before carrying out the process of the invention on a relatively large scale, the plant of the invention can be operated on a smaller scale. Here, it is possible to operate a pilot plant on a relatively small scale using only a substream of the methane-containing gas from natural sources. The substream of the gas from natural sources is in this case purified and examined in order then to be able to design the plant for industrial scale feeds. Here, methane-containing gas from natural sources which is to be purified and has previously been filtered, desulfurized and dried can be fed to the plant in step b) of the process.

The individual process parameters of the process of the invention can be adapted when carrying out the process. In this way, the methane content of the process product, i.e. the purified gas from natural sources, can be improved further.

The following parameters of the plant of the invention or of the process of the invention (process parameters) can be varied: volume flow of circulation water, salt content of circulation water, circulation water pressure, volume flow of stripping gas, subatmospheric pressure of stripping gas, volume flow of gas from natural sources, pressure of gas from natural sources and temperature of the circulation water.

The properties of the individual components of the plant of the invention and the process of the invention are described in more detail below.

a) Water Tank 3

The plant of the invention can have a water tank 3. The usable fill volume of the water tank can be in the range from 500 to 2000 liters. The water tank 3 can particularly preferably have a usable fill volume of 1000 liters. However, the volume of the water tank 3 can also be adapted to the plant according to requirements, i.e. enlarged or made smaller. The water tank 3 is preferably located upstream of the circulation pump 4 and more preferably downstream of the softening or deionization plant. This means that the deionized water leaving the softening or deionization plant can go via a connection into the water tank 3 and be collected there before it leaves the water tank 3 via an outlet and is fed by means of the circulation pump 4 to the degassing module 1 or trickle tower 10. The water tank 3 can have a further connection via which water returning from the gas exchange module 2, which has taken up undesirable gases from the methane-containing gas from natural sources, can re-enter the water tank 3.

b) Circulation Pump 4

The circulation pump 4 can transport water in the circuit of the plant of the invention. Here, the circulation pump 4 pumps water, preferably from a water tank 3 or preferably directly from the deionization plant, into the degassing module 1 and from there via the gas exchange module 2 back to the beginning of the circuit, i.e. preferably back to the water tank 3. The circulation pump 4 can be a pressure-increasing pump. Furthermore, the circulation pump 4 can be frequency-regulated. The circulation water pressure and the volume flow can be set by means of the circulation pump 4.

c) Degassing Module 1 and Gas Exchange Module 2

The plant of the invention comprises at least one degassing module 1 and/or at least one trickle tower 10 and at least one gas exchange module 2. Both modules comprise a water-impermeable, gas-permeable, microporous membrane which is preferably a hollow fiber membrane. In a preferred embodiment, the degassing module 1 and the gas exchange module 2 are of the same type. In preferred embodiments, the degassing module 1 and the gas exchange module 2 are each the gas exchange module Liqui-Cel® from Membrana (Membrana, Charlotte, N.C., USA).

d) Vacuum Pump 6

In an embodiment of the plant of the invention, at least one vacuum pump 6 can generate a subatmospheric pressure on the gas side of the degassing module 1. In this way, air is preferably drawn via an air filter 5 through the degassing module 1. The filtered air flows in the direction of the vacuum and acts as "stripping gas" to take up the gases dissolved in the water at the pores of the microporous membrane. Instead of air, it is also possible to use, for example, nitrogen as "stripping gas"; this flows in the direction of the vacuum applied by the vacuum pump 6 and in the process takes up the gases dissolved in the water at the pores of the microporous membrane. The partial pressure gradient from the water side of the membrane in the direction of the stripping gas/vacuum side of the membrane can be set by means of the subatmospheric pressure applied by the vacuum pump 6.

In a further embodiment of the plant of the invention, two or more vacuum pumps 6 can generate a subatmospheric pressure on the gas side of the degassing module 1. The pressure and the volume flow of the stripping gas can be set by means of the one or two or more vacuum pumps 6.

e) Air Filter 5

In a further embodiment of the present invention, the plant can have one or more air filters 6, which is/are preferably a fine filter. The air filter 5 has the function of preventing entry of particles into the degassing module 1 at the inlet for the stripping gas, which is preferably air or nitrogen, of the degassing module 1 and thus of protecting the gas side of the degassing module 1 against contamination. In a preferred embodiment, the plant has two air filters, which are preferably fine filters, at the inlet for the stripping gas into the degassing module 1.

f) Instrumentation

The plant of the invention can have the installed measurement facilities listed below in table 1:

TABLE 1

Installed measurement facilities of the plant. The parameters pressure, flow, conductivity, pH, methane, temperature and water hardness are measured.

| Parameter | Measurement position | Type of transmission | Description |
|---|---|---|---|
| Pressure | PI CP001 | Analog | Regulating parameter for feed pump |
| Pressure | PI CP002 | Manual | Pressure of water before degassing |
| Pressure | PI CP003 | Manual | Pressure of water downstream of degassing |
| Pressure | PI CP004 | Manual | Pressure of water before gas purification |
| Pressure | PI CP005 | Manual | Pressure of water downstream of gas purification |
| Pressure | PI CO010 | Manual | Pressure of stripping gas before degassing |
| Pressure | PI CO011 | Manual | Pressure of stripping gas downstream of degassing |
| Pressure | PI CO012 | Manual | Pressure of gas from natural sources before gas purification |
| Pressure | PI CO013 | Manual | Pressure of gas from natural sources downstream of gas purification |
| Flow | FI CF001 | Manual | Flow of stripping gas |
| Flow | FI CF002 | Manual | Flow of water |
| Flow | FI CF003 | Manual | Flow of gas from natural sources |
| Flow | FI CF004 | Manual | Flow of methane gas |
| Conductivity | LF CQ 001 | Analog | Conductivity of water downstream of degassing |
| Conductivity | LF CQ 002 | Analog | Conductivity of water downstream of gas purification |

TABLE 1-continued

Installed measurement facilities of the plant. The parameters pressure, flow, conductivity, pH, methane, temperature and water hardness are measured.

| Parameter | Measurement position | Type of transmission | Description |
|---|---|---|---|
| pH | QI CQ 001 | Analog | pH of water downstream of degassing |
| Methane | QI CQ003 | Analog | Methane gas content in the gas from natural sources before and after gas purification module |
| pH | QI CQ004 | Analog | pH in the recirculation vessel and downstream of degassing |
| Temperature | TI CT001 | Analog | Temperature of water downstream of degassing |
| Temperature | TI CT002 | Analog | Temperature of water downstream of gas purification |
| Water hardness | | Manual | Hardness of the water in the recirculation vessel |

Further technical properties of the apparatus of the invention and the process of the invention, and also monitoring and optimization thereof, are described below.

In the circulation water, it is possible to measure the parameters pH, pressure over the membrane contactors, volume flow over the membrane contactors, conductivity, hardness and temperature.

In the gas from natural sources, it is possible to measure the parameters volume flow, temperature, pressure over membrane contactors and methane gas content.

In the stripping gas, it is possible to measure the purity in respect of the presence of $CO_2$.

Degassing Module 1 and Step a): Degassing in at Least One Degassing Module 1

Degassing module 1 and step a) of the invention aim at very complete removal of the carbon dioxide ($CO_2$) dissolved in the circulation water. A very high mass transfer of $CO_2$ from the aqueous solution into the gas phase should be achieved for this purpose.

For successful degassing in the degassing module 1 of the plant and in step a) of the process of the invention, the following parameters can be optimized:

1) Turbulent flow of the water through the degassing module. Here, measurement of the flow makes it possible to regulate the flow conditions.

2) Salt content of the water: The salt content of the water is critical for the uptake capacity for dissolved gases.

3) Setting of the pH: Here, measurement of the pH can be carried out in the inflow stream and outflow stream to/from the module.

4) Regulation of the water temperature: The temperature can be measured in the circulation water. The use of heat exchangers may be necessary.

5) Variation of the stripping gas: As stripping gas, it is possible to use ambient air (filtered) or pure nitrogen or a mixture of the two gases. The volume flow of the stripping gas can be optimally matched to the rate at which the gases going over from the water into the stripping gas are transported away. The partial pressure gradient from the water side of the membrane in the direction of the stripping gas/vacuum side of the membrane can be set by means of the subatmospheric pressure applied by the vacuum pump 6.

In an alternative embodiment of the invention, degassing in step a) is carried out using a trickle tower 10 instead of the degassing module 1. The aim is likewise to achieve very complete removal of the carbon dioxide ($CO_2$) dissolved in the circulation water. Here too, a very high mass transfer of $CO_2$ from the aqueous solution into the gas phase should be achieved for this purpose. The advantage of the trickle tower 10 compared to the degassing module 1 is not least that the costly membrane required in the degassing module can be dispensed with. Trickle towers are, for the purposes of the present invention, particularly useful when the methane content is to be increased in the process of the invention from below 60% in the gas from natural sources, by, for example, 50% to values which are only slightly higher, preferably 60-80%, more preferably 60-700, in particular by 65%.

An illustrative trickle tower will be briefly described below. The trickle tower consists of a column for spraying and trickling down of the $CO_2$-containing water and an integrated collection vessel which at the same time serves as pump reservoir. The $CO_2$-containing water is introduced from the top into the trickle tower, sprayed by means of a solid cone spiral nozzle and subsequently passed over the Pall ring packing present in the trickle column. The construction type of the packing elements results in frequent reformation of the surfaces by means of which the gases present in the water are liberated. A strong air stream generated by a fan is conveyed through the column in countercurrent, from the bottom upward, and carries away the liberated gases. In this way, the content of free carbon dioxide can be significantly reduced.

The water which is low in carbon dioxide is collected in a water tank 3 and fed via conveying pumps to the gas exchange module 2.

Gas Exchange Module 2 and Step b): Gas Exchange in at Least One Gas Exchange Module 2

Gas exchange module 2 of the plant of the invention and step b) of the process of the invention "b) Gas exchange in at least one gas exchange module 2" carry out the purification of the methane-containing gas from natural sources. In this gas purification stage, purification of the gas from natural sources which is to be treated takes place. A very high mass transfer of undesirable gases, for example carbon dioxide ($CO_2$) and hydrogen sulfide ($H_2S$), from the methane-containing gas from natural sources into the aqueous phase of the introduced circulation water which has been deionized and degassed is the objective here.

For successful removal of such undesirable gases from the methane-containing gas from natural sources, it is possible to optimize the following parameters:

1) Flow velocity over the membrane and amount of the gas from natural sources:

Here, the amount and the measurement of the inflowing and outflowing volume stream of gas from natural sources can be regulated. The gas from natural sources can be pumped at a gauge pressure of from 50 mbar to 1000 mbar, preferably from 300 mbar to 400 mbar, through the gas exchange module 2 in countercurrent to the water.

2) Maximum concentration gradients at the phase boundary in the pores of the microporous membrane:

Here, the important thing is optimal removal of carbon dioxide ($CO_2$) in the preceding step a) degassing in the degassing module 1, so that carbon dioxide present in the gas from natural sources goes over into the degassed water at the microporous membrane in the gas exchange module 2.

EXAMPLES

Example 1

In example 1, the plant of the invention was tested, with the methane content of the methane-containing gas from natural sources, in this case biogas, being measured as a function of the volume flow of water.

In two trials, the effect of different volume flows of water on the methane content in the biogas at the outlet of the gas exchange module 2 was tested. The other boundary conditions, in particular the volume flow of biogas, were kept constant for the duration of the experiment. They are shown in table 2. In a second step, the subatmospheric pressure in the stripping gas was varied under constant boundary conditions.

Results

Figure 5:
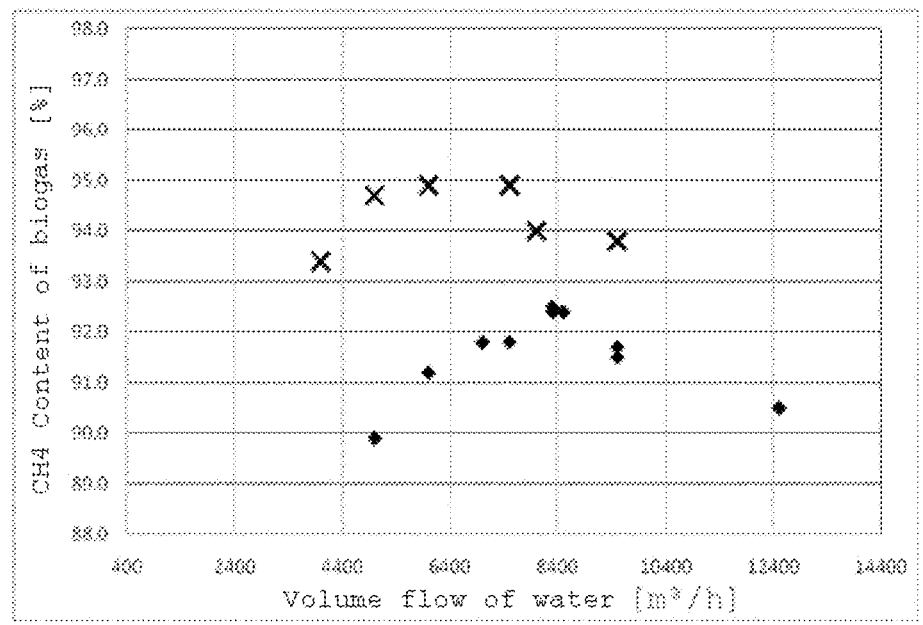
FIG. 5 shows the result of an experimental run on the plant, in which the methane content of the gas from natural sources, here biogas, was measured as a function of the volume flow of water (example 1 and table 2).

The results of example 1 are shown in FIG. 5 and table 2.

TABLE 2

| Constant boundary conditions in examples Ex 1.1 and Ex 1.2 | | | | |
|---|---|---|---|---|
| Measurement point | Description in text | Unit | Ex 1.1 | Ex 1.2 |
|  | Frequency of circulation pump 4 | [Hz] | 25 | 25 |
| PI CP001 | Pressure of water before degassing | [bar] | 0.84 | 0.84 |
| PI CP002 | Pressure of water before degassing | [bar] | 0.6 | 0.6 |
| PI CP005 | Pressure of water downstream of contact with gas | [bar] | 0.4 | 0.4 |
| PI CP011 | Pressure of stripping gas downstream of degassing | [bar] | −0.8 gauge pressure | −0.6 gauge pressure |
| LF CQ002 | Conductivity of water downstream of contact with gas | [µS/cm] | 231 | 288 |
| TI CT002 | Temperature of water downstream of contact with gas | [° C.] | 8.1° C. | 8.8 |
| FI CF003 | Volume flow of biogas | [Nm³/h] | 4.8 | 5.5 |

A distinct relationship between the effectiveness of removal of undesirable gases, for example hydrogen sulfide ($H_2S$) and carbon dioxide ($CO_2$), and the water volume flowing over the membranes is apparent. The causes of this are both hydraulic and chemical in nature.

Example 2

In example 2, the plant of the invention was tested, with the methane content of the gas from natural sources, in this case biogas, being measured as a function of the volume flow of the biogas.

In two trials, the effect of various volume flows of biogas on the methane content in the biogas at the outlet of the gas exchange module 2 was tested. The other boundary conditions, in particular the volume flow of water, were kept constant for the duration of the experiment. They are shown in table 3. In a second step, the subatmospheric pressure of the stripping gas was varied at constant boundary conditions.

Results

Figure 6:
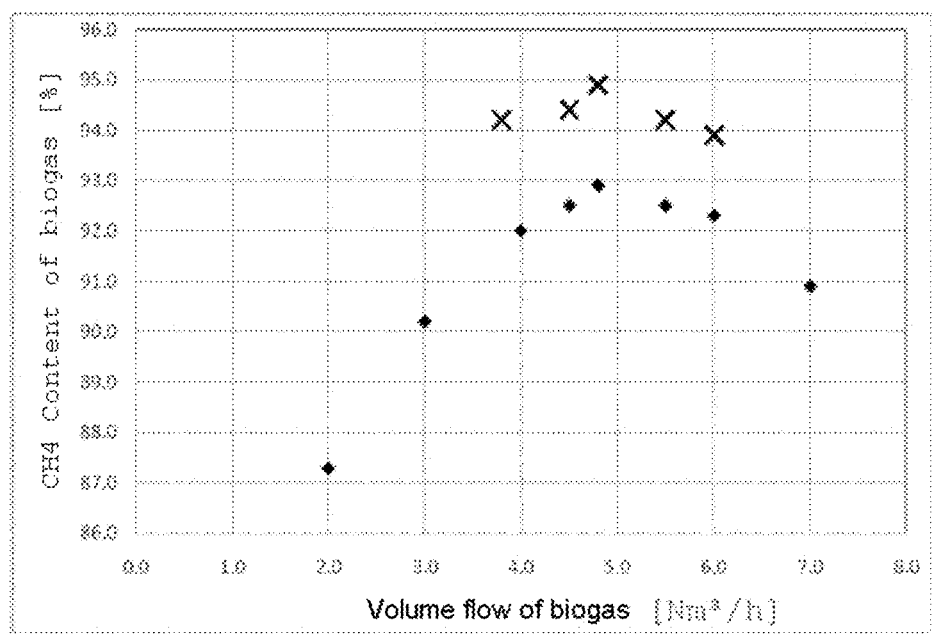
FIG. 6 shows the result of an experimental run on the plant, in which the methane content of the gas from natural sources, here biogas, was measured as a function of the volume flow of the biogas (example 2 and table 3).
Figure 7:
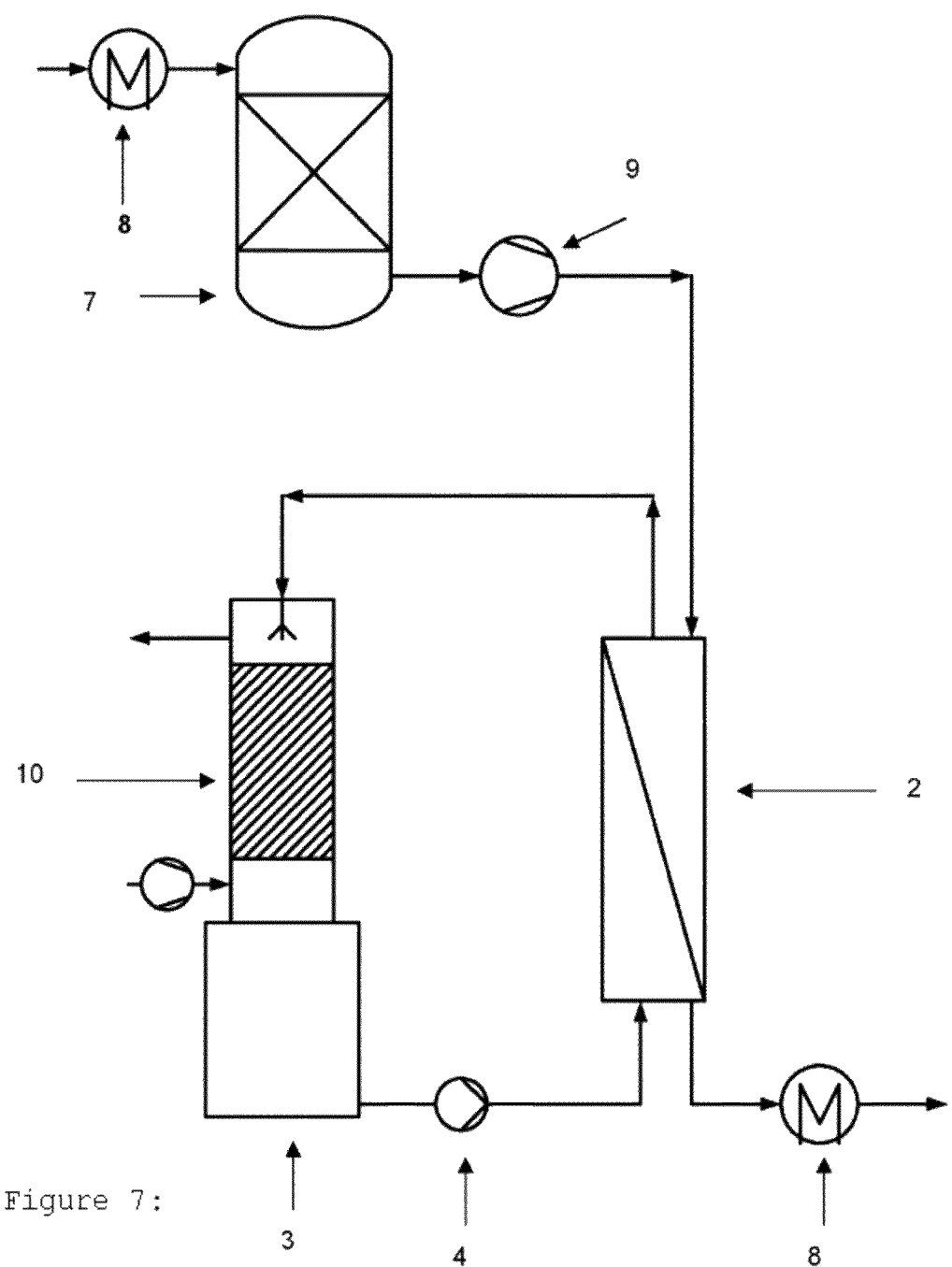
FIG. 7 shows a further embodiment of the plant of the invention analogous to FIG. 4 but without degassing module.

The results of example 2 are shown in FIG. 6 and in table 3.

TABLE 3

Constant boundary conditions in examples ex. 2.1 and ex. 2.2

| Measurement point | Description in text | Unit | Ex 2.1 | Ex 2.2 |
|---|---|---|---|---|
| | Frequency of circulation pump 4 | [Hz] | 25 | 25 |
| PI CP001 | Pressure of water before degassing | [bar] | 0.84 | 0.84 |
| PI CP002 | Pressure of water before degassing | [bar] | 0.6 | 0.6 |
| PI CP005 | Pressure of water downstream of contact with gas | [bar] | 0.4 | 0.4 |

TABLE 3-continued

Constant boundary conditions in examples ex. 2.1 and ex. 2.2

| Measurement point | Description in text | Unit | Ex 2.1 | Ex 2.2 |
|---|---|---|---|---|
| PI CP011 | Pressure of stripping gas downstream of degassing | [bar] | −0.8 gauge pressure | −0.6 gauge pressure |
| QI LF002 | Conductivity of water downstream of contact with gas | [µS/cm] | 330 | 290 |
| TI CT002 | Temperature of water downstream of contact with gas | [°C.] | 8.1 | 8.8 |
| FI CF002 | Volume flow of water | [m³/h] | 7.5 | 8.3 |

The operating parameters in the experiments of examples 1 and 2 are shown in table 4:

| | | | Nov. 29, 2010 | Nov. 29, 2010 | Nov. 29, 2010 | Nov. 29, 2010 | Nov. 29, 2010 |
|---|---|---|---|---|---|---|---|
| | | | 17:00 | 18:00 | 18.15 | 18:30 | 18.45 |
| Fill level | L 01 | % | 102% | 102% | 102% | 102% | 102% |
| pH | | | 5.7 | 5.6 | 5.6 | 5.5 | 5.5 |
| Pressure downstream of circulation pump 4 | P 01 | bar | 1.20 | 1.20 | 1.20 | 1.20 | 1.20 |
| Pressure before degassing | P 02 | bar | 1.00 | 1.00 | 1.00 | 1.00 | 1.00 |
| Pressure downstream of degassing | P 03 | bar | 0.80 | 0.80 | 0.80 | 0.50 | 0.90 |
| Pressure before contact with gas | P04 | bar | 0.90 | 0.90 | 0.90 | 0.50 | 0.95 |
| Pressure of recycle stream | P 05 | bar | 0.80 | 0.80 | 0.80 | 0.40 | 0.95 |
| Throughput of water | F03 | m³/h | 8500 | 8500 | 8500 | 6000 | 6000 |
| Pressure of stripping gas | P 10 | bar | −0.50 | −0.50 | −0.50 | −0.40 | −0.45 |
| Pressure of vacuum | P 11 | bar | −0.60 | −0.60 | −0.60 | −0.50 | −0.60 |
| Pressure of methane before | P12 | mbar | 100 | 100 | 100 | 95 | 95 |
| Pressure of methane downstream | P13 | mbar | 75 | 75 | 75 | 75 | 75 |
| Conductivity of degassed PW | LF 01 | µS | 288 | 288 | 288 | 285 | 286 |
| Temperature of degassed PW | TI 01 | °C. | 9.5 | 9.5 | 9.5 | 9.3 | 9.3 |
| Conductivity of adsorbent | LF 01 | µS | 288 | 288 | 288 | 284 | 285 |
| Temperature of adsorbent | TI 01 | °C. | 9.5 | 9.5 | 9.5 | 9.2 | 9.17 |
| Throughput of biogas | FI 03 | Nm³/h | 6.0 | 4.0 | 2.5 | 6.0 | 6.0 |
| Methane content of biogas, purified | CH4 | % | 88.0 | 88.0 | 89.5 | 90.4 | 90.2 |
| Methane content of biogas, raw | CH4 | % | | | 55 | | |

| | | | Nov. 30, 2010 | Nov. 30, 2010 | Nov. 30, 2010 | Nov. 30, 2010 | Nov. 30, 2010 | Nov. 30, 2010 | Nov. 30, 2010 |
|---|---|---|---|---|---|---|---|---|---|
| | | | 10:45 | 11:00 | 11:15 | 11:30 | 11:45 | 12:00 | 12:15 |
| Fill level | L 01 | % | 102% | 102% | 102% | 102% | 102% | 102% | 102% |
| pH | | | 5.5 | 5.5 | 5.5 | 5.5 | 5.5 | 5.5 | 5.5 |
| Pressure downstream of circulation pump 4 | P 01 | bar | 0.85 | 0.84 | 0.82 | 0.84 | 0.84 | 0.84 | 0.84 |
| Pressure before degassing | P 02 | bar | 0.60 | 0.60 | 0.55 | 0.50 | 0.60 | 0.65 | 0.60 |
| Pressure downstream of degassing | P 03 | bar | 0.50 | 0.50 | 0.45 | 0.50 | 0.50 | 0.55 | 0.50 |
| Pressure before contact with gas | P04 | bar | 0.60 | 0.55 | 0.50 | 0.60 | 0.60 | 0.60 | 0.60 |
| Pressure of recycle stream | P 05 | bar | 0.50 | 0.40 | 0.30 | 0.50 | 0.40 | 0.50 | 0.50 |
| Throughput of water | F03 | m³/h | 6000 | 9500 | 12500 | 8500 | 7000 | 5000 | 7500 |
| Pressure of stripping gas | P 10 | bar | −0.45 | −0.45 | −0.45 | −0.45 | −0.45 | −0.45 | −0.45 |
| Pressure of vacuum | P 11 | bar | −0.60 | −0.60 | −0.60 | −0.60 | −0.60 | −0.60 | −0.60 |
| Pressure of methane before | P12 | mbar | 95 | 95 | 95 | 95 | 95 | 95 | 95 |
| Pressure of methane downstream | P13 | mbar | 75 | 75 | 75 | 75 | 75 | 75 | 75 |
| Conductivity of degassed PW | LF 01 | µS | 287 | 288 | 288 | 289 | 289 | 290 | 290 |
| Temperature of degassed PW | TI 01 | °C. | 9.0 | 9.0 | 9.0 | 9.0 | 9.0 | 9.0 | 9.0 |
| Conductivity of adsorbent | LF 01 | µS | 290 | 290 | 290 | 290 | 290 | 290 | 290 |
| Temperature of adsorbent | TI 01 | °C. | 9 | 9 | 9 | 9 | 9 | 9 | 9 |
| Throughput of biogas | FI 03 | Nm³/h | 5.5 | 5.5 | 5.5 | 5.5 | 5.5 | 5.5 | 5.5 |

-continued

| | | | | | | | | | |
|---|---|---|---|---|---|---|---|---|---|
| Methane content of biogas, purified | CH4 | % | 91.2 | 91.7 | 90.5 | 92.4 | 91.8 | 89.9 | 91.8 |
| Methane content of biogas, raw | CH4 | % | 56.3 | 56.3 | 56.3 | 56.3 | 56.3 | 56.3 | 56.3 |

| | | | Date | | | | | | |
|---|---|---|---|---|---|---|---|---|---|
| | | | Nov. 30, 2010 | Nov. 30, 2010 | Nov. 30, 2010 | Nov. 30, 2010 | Nov. 30, 2010 | Nov. 30, 2010 | Nov. 30, 2010 |
| | | | \multicolumn{7}{c}{Time of day} | | | |
| | | | 12:30 | 12:45 | 14:15 | 14:40 | 14:50 | 15:20 | 15:40 |
| Fill level | L 01 | % | 102% | 102% | 102% | 102% | 102% | 102% | 102% |
| pH | | | 5.6 | 5.6 | 5.6 | 5.6 | 5.6 | 5.6 | 5.6 |
| Pressure downstream of circulation pump 4 | P 01 | bar | 0.84 | 0.84 | 0.84 | 0.84 | 0.84 | 0.84 | 0.84 |
| Pressure before degassing | P 02 | bar | 0.60 | 0.60 | 0.60 | 0.60 | 0.60 | 0.60 | 0.60 |
| Pressure downstream of degassing | P 03 | bar | 0.50 | 0.50 | 0.50 | 0.50 | 0.50 | 0.50 | 0.50 |
| Pressure before contact with gas | P04 | bar | 0.60 | 0.60 | 0.60 | 0.60 | 0.60 | 0.60 | 0.60 |
| Pressure of recycle stream | P 05 | bar | 0.50 | 0.50 | 0.45 | 0.45 | 0.45 | 0.45 | 0.45 |
| Throughput of water | F03 | m$^3$/h | 9500 | 8300 | 8300 | 8300 | 8300 | 8300 | 8300 |
| Pressure of stripping gas | P 10 | bar | −0.45 | −0.45 | −0.45 | −0.45 | −0.45 | −0.45 | −0.45 |
| Pressure of vacuum | P 11 | bar | −0.60 | −0.60 | −0.60 | −0.60 | −0.60 | −0.60 | −0.60 |
| Pressure of methane before | P12 | mbar | 95 | 95 | 95 | 95 | 95 | 95 | 92 |
| Pressure of methane downstream | P13 | mbar | 75 | 75 | 75 | 80 | 82 | 85 | 70 |
| Conductivity of degassed PW | LF 01 | µS | 290 | 290 | 290 | 290 | 290 | 290 | 290 |
| Temperature of degassed PW | TI 01 | ° C. | 9.0 | 9.0 | 8.8 | 8.8 | 8.8 | 8.8 | 8.8 |
| Conductivity of adsorbent | LF 01 | µS | 290 | 290 | 290 | 290 | 290 | 290 | 290 |
| Temperature of adsorbent | TI 01 | ° C. | 9 | 9 | 8.8 | 8.8 | 8.8 | 8.8 | 8.8 |
| Throughput of biogas | FI 03 | Nm$^3$/h | 5.5 | 5.5 | 5.5 | 4.0 | 3.0 | 2.0 | 7.0 |
| Methane content of biogas, purified | CH4 | % | 91.5 | 92.4 | 92.5 | 92.0 | 90.2 | 87.3 | 90.9 |
| Methane content of biogas, raw | CH4 | % | 56.3 | 56.3 | 56.7 | | | | |

| | | | Date | | | | | | |
|---|---|---|---|---|---|---|---|---|---|
| | | | Nov. 30, 2010 | Nov. 30, 2010 | Nov. 30, 2010 | Nov. 30, 2010 | Nov. 30, 2010 | Nov. 30, 2010 | Nov. 30, 2010 |
| | | | \multicolumn{7}{c}{Time of day} | | | |
| | | | 15:55 | 16:15 | 16:45 | 17:10 | 17:20 | 17:30 | 17:45 |
| Fill level | L 01 | % | 102% | 102% | 102% | 102% | 102% | 102% | 102% |
| pH | | | 5.6 | 5.6 | 5.6 | 5.6 | 5.6 | 5.8 | 5.8 |
| Pressure downstream of circulation pump 4 | P 01 | bar | 0.84 | 0.84 | 0.84 | 0.84 | 0.84 | 0.84 | 0.84 |
| Pressure before degassing | P 02 | bar | 0.60 | 0.60 | 0.60 | 0.60 | 0.60 | 0.60 | 0.60 |
| Pressure downstream of degassing | P 03 | bar | 0.50 | 0.50 | 0.50 | 0.50 | 0.50 | 0.50 | 0.50 |
| Pressure before contact with gas | P04 | bar | 0.60 | 0.60 | 0.60 | 0.60 | 0.60 | 0.60 | 0.60 |
| Pressure of recycle stream | P 05 | bar | 0.45 | 0.45 | 0.45 | 0.45 | 0.45 | 0.45 | 0.45 |
| Throughput of water | F03 | m$^3$/h | 8300 | 8300 | 8300 | 8300 | 9300 | 9300 | 9300 |
| Pressure of stripping gas | P 10 | bar | −0.45 | −0.45 | −0.45 | −0.60 | −0.60 | −0.60 | −0.60 |
| Pressure of vacuum | P 11 | bar | −0.60 | −0.60 | −0.60 | −0.80 | −0.80 | −0.80 | −0.80 |
| Pressure of methane before | P12 | mbar | 95 | 95 | 95 | 95 | 95 | 95 | 95 |
| Pressure of methane downstream | P13 | mbar | 75 | 75 | 75 | 75 | 75 | 75 | 75 |
| Conductivity of degassed PW | LF 01 | µS | 290 | 290 | 290 | 293 | 293 | 293 | 293 |
| Temperature of degassed PW | TI 01 | ° C. | 8.8 | 8.8 | 8.8 | 8.7 | 8.7 | 8.7 | 8.7 |
| Conductivity of adsorbent | LF 01 | µS | 290 | 290 | 290 | 293 | 293 | 293 | 293 |
| Temperature of adsorbent | TI 01 | ° C. | 8.8 | 8.8 | 8.8 | 8.7 | 8.7 | 8.7 | 8.7 |
| Throughput of biogas | FI 03 | Nm$^3$/h | 6.0 | 4.5 | 4.8 | 4.8 | 4.8 | 4.8 | 4.8 |
| Methane content of biogas, purified | CH4 | % | 92.3 | 92.5 | 92.9 | 93.8 | 93.9 | 94.0 | 93.9 |
| Methane content of biogas, raw | CH4 | % | | | | | | | |

| | | | Date | | | |
|---|---|---|---|---|---|---|
| | | | Nov. 30, 2010 | Nov. 30, 2010 | Nov. 30, 2010 | Nov. 30, 2010 |
| | | | \multicolumn{4}{c}{Time of day} | | | |
| | | | 17:55 | 18:10 | 18:30 | 18:45 |
| Fill level | L 01 | % | 102% | 102% | 102% | 102% |
| pH | | | 5.8 | 5.8 | 6.0 | 5.8 |
| Pressure downstream of circulation pump 4 | P 01 | bar | 0.84 | 0.84 | 0.84 | 0.84 |
| Pressure before degassing | P 02 | bar | 0.60 | 0.60 | 0.60 | 0.60 |
| Pressure downstream of degassing | P 03 | bar | 0.50 | 0.50 | 0.50 | 0.50 |
| Pressure before contact with gas | P04 | bar | 0.60 | 0.60 | 0.60 | 0.60 |
| Pressure of recycle stream | P 05 | bar | 0.45 | 0.45 | 0.45 | 0.45 |
| Throughput of water | F03 | m$^3$/h | 8300 | 8300 | 8300 | 8300 |
| Pressure of stripping gas | P 10 | bar | −0.60 | −0.60 | −0.60 | −0.60 |
| Pressure of vacuum | P 11 | bar | −0.80 | −0.80 | −0.80 | −0.80 |
| Pressure of methane before | P12 | mbar | 95 | 95 | 95 | 95 |
| Pressure of methane downstream | P13 | mbar | 75 | 75 | 75 | 75 |
| Conductivity of degassed PW | LF 01 | µS | 293 | 293 | 293 | 293 |

-continued

| | | | | | | | |
|---|---|---|---|---|---|---|---|
| Temperature of degassed PW | TI 01 | °C. | 8.7 | 8.7 | 8.7 | 8.7 | |
| Conductivity of adsorbent | LF 01 | µS | 293 | 293 | 293 | 293 | |
| Temperature of adsorbent | TI 01 | °C. | 8.7 | 8.7 | 8.7 | 8.7 | |
| Throughput of biogas | FI 03 | Nm³/h | 4.8 | 4.8 | 4.8 | 4.8 | |
| Methane content of biogas, purified | CH4 | % | 94.2 | 94.4 | 94.5 | 94.2 | |
| Methane content of biogas, raw | CH4 | % | | | | | |

| | | | Date | | | | | | |
|---|---|---|---|---|---|---|---|---|---|
| | | | Dec. 01, 2010 | Dec. 01, 2010 | Dec. 01, 2010 | Dec. 01, 2010 | Dec. 01, 2010 | Dec. 01, 2010 | Dec. 01, 2010 |
| | | | \multicolumn{7}{c}{Time of day} | | | | | | |
| | | | 16:25 | 16:35 | 16:45 | 17:00 | 17:15 | 17:30 | 17:45 |
| Fill level | L 01 | % | 102% | 102% | 102% | 102% | 102% | 102% | 102% |
| pH | | | 6.2 | 6.2 | 6.2 | 6.2 | 6.2 | 6.2 | 6.2 |
| Pressure downstream of circulation pump 4 | P 01 | bar | 0.84 | 0.84 | 0.84 | 0.84 | 0.84 | 0.84 | 0.84 |
| Pressure before degassing | P 02 | bar | 0.60 | 0.60 | 0.60 | 0.60 | 0.60 | 0.60 | 0.60 |
| Pressure downstream of degassing | P 03 | bar | 0.50 | 0.50 | 0.50 | 0.50 | 0.50 | 0.50 | 0.50 |
| Pressure before contact with gas | P04 | bar | 0.60 | 0.60 | 0.60 | 0.60 | 0.60 | 0.60 | 0.60 |
| Pressure of recycle stream | P 05 | bar | 0.45 | 0.45 | 0.45 | 0.45 | 0.45 | 0.45 | 0.45 |
| Throughput of water | F03 | m³/h | 7500 | 7500 | 7500 | 7500 | 7500 | 7500 | 7500 |
| Pressure of stripping gas | P 10 | bar | −0.60 | −0.60 | −0.60 | −0.60 | −0.60 | −0.60 | −0.60 |
| Pressure of vacuum | P 11 | bar | −0.80 | −0.80 | −0.80 | −0.80 | −0.80 | −0.80 | −0.80 |
| Pressure of methane before | P12 | mbar | 95 | 95 | 95 | 95 | 95 | 95 | 95 |
| Pressure of methane downstream | P13 | mbar | 75 | 75 | 75 | 75 | 75 | 75 | 75 |
| Conductivity of degassed PW | LF 01 | µS | 291 | 291 | 333 | 333 | 333 | 333 | 333 |
| Temperature of degassed PW | TI 01 | °C. | 8.5 | 8.5 | 8.5 | 8.5 | 8.5 | 8.5 | 8.2 |
| Conductivity of adsorbent | LF 01 | µS | 293 | 293 | 330 | 330 | 330 | 330 | 330 |
| Temperature of adsorbent | TI 01 | °C. | 8.5 | 8.5 | 8.5 | 8.5 | 8.5 | 8.5 | 8.2 |
| Throughput of biogas | FI 03 | Nm³/h | 5.0 | 5.0 | 5.0 | 5.0 | 6.0 | 5.5 | 4.5 |
| Methane content of biogas, purified | CH4 | % | 95.1 | 95.2 | 95.1 | 94.8 | 93.9 | 94.2 | 94.4 |
| Methane content of biogas, raw | CH4 | % | | | | | | | |

| | | | Date | | | | | |
|---|---|---|---|---|---|---|---|---|
| | | | Dec. 01, 2010 | Dec. 01, 2010 | Dec. 01, 2010 | Dec. 01, 2010 | Dec. 01, 2010 | Dec. 01, 2010 |
| | | | \multicolumn{6}{c}{Time of day} | | | | | |
| | | | 18:00 | 18:15 | 18:45 | 19:00 | 19:15 | 19:30 | 19:45 |
| Fill level | L 01 | % | 102% | 102% | 102% | 102% | 102% | 102% | 102% |
| pH | | | 6.2 | 6.2 | 6.2 | 6.2 | 6.2 | 6.2 | 6.2 |
| Pressure downstream of circulation pump 4 | P 01 | bar | 0.84 | 0.84 | 0.84 | 0.84 | 0.84 | 0.84 | 0.84 |
| Pressure before degassing | P 02 | bar | 0.60 | 0.60 | 0.60 | 0.60 | 0.60 | 0.60 | 0.60 |
| Pressure downstream of degassing | P 03 | bar | 0.50 | 0.50 | 0.50 | 0.50 | 0.50 | 0.50 | 0.50 |
| Pressure before contact with gas | P04 | bar | 0.60 | 0.60 | 0.60 | 0.60 | 0.60 | 0.60 | 0.60 |
| Pressure of recycle stream | P 05 | bar | 0.45 | 0.45 | 0.50 | 0.50 | 0.50 | 0.50 | 0.50 |
| Throughput of water | F03 | m³/h | 7500 | 7500 | 6000 | 5000 | 4000 | 8000 | 9500 |
| Pressure of stripping gas | P 10 | bar | −0.60 | −0.60 | −0.60 | −0.60 | −0.60 | −0.60 | −0.60 |
| Pressure of vacuum | P 11 | bar | −0.80 | −0.80 | −0.80 | −0.80 | −0.80 | −0.80 | −0.80 |
| Pressure of methane before | P12 | mbar | 95 | 95 | 95 | 95 | 95 | 95 | 95 |
| Pressure of methane downstream | P13 | mbar | 75 | 75 | 75 | 75 | 75 | 75 | 75 |
| Conductivity of degassed PW | LF 01 | µS | 333 | 333 | 333 | 333 | 333 | 333 | 333 |
| Temperature of degassed PW | TI 01 | °C. | 8.4 | 8.3 | 8.2 | 8.1 | 8.1 | 8.1 | 8.1 |
| Conductivity of adsorbent | LF 01 | µS | 330 | 330 | 330 | 330 | 330 | 330 | 330 |
| Temperature of adsorbent | TI 01 | °C. | 8.4 | 8.3 | 8.1 | 8.1 | 8.1 | 8.1 | 8.1 |
| Throughput of biogas | FI 03 | Nm³/h | 3.8 | 4.8 | 4.8 | 4.8 | 4.8 | 4.8 | 4.8 |
| Methane content of biogas, purified | CH4 | % | 94.2 | 94.9 | 94.9 | 94.7 | 93.4 | 94.0 | 93.8 |
| Methane content of biogas, raw | CH4 | % | | | | | | | |

| | | | Date | |
|---|---|---|---|---|
| | | | Mar. 27, 2011 | Mar. 27, 2011 |
| | | | \multicolumn{2}{c}{Time of day} | |
| | | | 13:00 | 13:00 |
| Fill level | L 01 | % | 101% | 101% |
| pH | | | 6.2 | 6.3 |
| Pressure downstream of circulation pump 4 | P 01 | bar | 1.00 | 1.00 |
| Pressure before degassing | P 02 | bar | 0.75 | 0.80 |
| Pressure downstream of degassing | P 03 | bar | 0.60 | |
| Pressure before contact with gas | P 04 | bar | 0.70 | 0.80 |
| Pressure of recycle stream | P 05 | bar | 0.55 | 0.60 |
| Throughput of water | FI 02 | m³/h | 10 | 7000 |
| Pressure of stripping gas | P 10 | bar | −0.50 | −0.60 |

-continued

| | | | | |
|---|---|---|---|---|
| Pressure of vacuum | P 11 | bar | −0.70 | −0.80 |
| Throughput of stripping gas | FI 01 | Nm³/h | 20.0 | 19.0 |
| Pressure of methane before | P 12 | mbar | | |
| Pressure of methane downstream | P 13 | mbar | | |
| Conductivity of degassed PW | LF 01 | μS | 288 | 288 |
| Temperature of degassed PW | TI 01 | ° C. | 9.7 | 9.9 |
| Conductivity of adsorbent | LF 01 | μS | 288 | 288 |
| Temperature of adsorbent | TI 01 | ° C. | 9.87 | 10 |
| Throughput of biogas | FI 03 | Nm³/h | 6.0 | 6.0 |
| Throughput of biogas | FI 04 | Nm³/h | 3.0 | 3.0 |
| Methane content of biogas, purified | CH4 | % | 90.7 | 90.0 |
| Methane content of biogas, raw | CH4 | % | | |

| | | | Date | | | | | | |
|---|---|---|---|---|---|---|---|---|---|
| | | | Mar. 30, 2011 | Mar. 30, 2011 | Mar. 30, 2011 | Mar. 30, 2011 | Mar. 30, 2011 | Mar. 30, 2011 | Mar. 30, 2011 |
| | | | \multicolumn{7}{c}{Time of day} |
| | | | 08:30 | 09:00 | 09:30 | 10:00 | 10:00 | 12:30 | 13:30 |
| Methane content of biogas, purified | CH4 | % | 95.08 | 94.82 | 95.34 | 97.15 | 96.96 | 97.19 | 97.83 |
| Methane content of biogas, raw | CH4 | % | — | — | — | — | — | — | — |
| pH | Q 04 | | 6.5 | 6.55 | 6.48 | 6.38 | 6.3 | 6.26 | 6.32 |
| Conductivity of degassed PW | LF 01 | μS | 301 | 301 | 301 | 302 | 301 | 301 | 302 |
| Temperature of degassed PW | TI 01 | ° C. | 16.23 | 16.09 | 15.89 | 15.65 | 15.48 | 14.96 | 14.81 |
| Conductivity of adsorbent | LF 02 | μS | 299 | 299 | 299 | 300 | 300 | 300 | 301 |
| Temperature of adsorbent | TI 02 | ° C. | 16.46 | 16.35 | 16.12 | 15.94 | 15.47 | 15.19 | 15.02 |
| Pressure downstream of circulation pump 4 | P 01 | bar | 1.00 | 1.00 | 1.00 | 1.00 | 1.00 | 1.00 | 1.00 |
| Fill level | L 01 | % | 94% | 94% | 94% | 94% | 94% | 93% | 93% |
| Pressure before degassing | P 02 | bar | 0.75 | 0.75 | 0.75 | 0.75 | 0.75 | 0.75 | 0.75 |
| Pressure downstream of degassing | P 03 | bar | 0.60 | 0.60 | 0.60 | 0.60 | 0.60 | 0.60 | 0.60 |
| Pressure before contact with gas | P 04 | bar | 0.70 | 0.70 | 0.70 | 0.70 | 0.70 | 0.70 | 0.70 |
| Pressure of recycle stream | P 05 | bar | 0.50 | 0.50 | 0.50 | 0.50 | 0.50 | 0.50 | 0.50 |
| Pressure of stripping gas | P 10 | bar | −0.40 | −0.40 | −0.50 | −0.50 | −0.50 | −0.50 | −0.50 |
| Pressure of vacuum | P 11 | bar | −0.50 | −0.60 | −0.70 | −0.70 | −0.70 | −0.70 | −0.70 |
| Throughput of stripping gas | FI 01 | Nm³/h | 30.00 | 30.00 | 20.00 | 20.00 | 20.00 | 20.00 | 20.00 |
| Throughput of water | FI 02 | m³/h | 11.00 | 11.00 | 11.00 | 11.00 | 11.00 | 11.00 | 11.00 |
| Throughput of biogas | FI 03 | Nm³/h | 6.00 | 6.00 | 6.00 | 7.00 | 7.00 | 7.50 | 7.50 |
| Temperature of biogas | T 02 | ° C. | 29 | 20 | 20 | 21 | 21 | 31 | 27 |
| Pressure of methane before | P 12 | mbar | | | | | | | |
| Pressure of methane downstream | P 13 | mbar | | | | | | | |
| Throughput of biogas | FI 04 | Nm³/h | 3.00 | 3.00 | 3.00 | 3.50 | 3.50 | 4.00 | 3.50 |
| Water hardness tank | | | — | — | — | — | — | — | — |
| Temperature of water tank | | | 31.2 | 30.6 | 30.4 | 29.7 | 29 | 27.8 | 27.4 |
| Methane content according to biogas plant | | ° C. | 55 | 55 | 54 | 54 | 54 | 54 | 53 |
| Ambient temperature in hanger | | % | 14 | 13 | 14 | 12 | 14 | 20 | 20 |
| Exterior temperature | | ° C. | 2 | 4 | 5 | 6 | 8 | 14 | 15 |
| pH in tank | | ° C. | 5.75 | 5.83 | 5.81 | 5.67 | 5.64 | 5.66 | 5.76 |

| | | | Date | | |
|---|---|---|---|---|---|
| | | | Mar. 30, 2011 | Mar. 30, 2011 | Mar. 30, 2011 |
| | | | \multicolumn{3}{c}{Time of day} |
| | | | 16:30 | 17:30 | 20:30 |
| Methane content of biogas, purified | CH4 | % | 97.54 | 98.15 | 97.68 |
| Methane content of biogas, raw | CH4 | % | — | — | — |
| pH | Q 04 | | 6.25 | 6.36 | 6.2 |
| Conductivity of degassed PW | LF 01 | μS | 303 | 303 | 303 |
| Temperature of degassed PW | TI 01 | ° C. | 14.61 | 14.61 | 14.15 |
| Conductivity of adsorbent | LF 02 | μS | 301 | 302 | 304 |
| Temperature of adsorbent | TI 02 | ° C. | 14.81 | 14.81 | 14.35 |
| Pressure downstream of feed pump | P 01 | bar | 1.00 | 1.00 | 1.00 |
| Fill level | L 01 | % | 93% | 93% | 92% |
| Pressure before degassing | P 02 | bar | 0.75 | 0.75 | 0.75 |
| Pressure downstream of degassing | P 03 | bar | 0.60 | 0.60 | 0.60 |
| Pressure before contact with gas | P 04 | bar | 0.70 | 0.70 | 0.70 |
| Pressure of recycle stream | P 05 | bar | 0.50 | 0.50 | 0.50 |
| Pressure of stripping gas | P 10 | bar | −0.50 | −0.50 | −0.50 |
| Pressure of vacuum | P 11 | bar | −0.70 | −0.70 | −0.70 |
| Throughput of stripping gas | FI 01 | Nm³/h | 20.00 | 20.00 | 20.00 |
| Throughput of water | FI 02 | m³/h | 11.00 | 11.00 | 11.00 |
| Throughput of biogas | FI 03 | Nm³/h | 7.00 | 7.00 | 7.00 |
| Temperature of biogas | T 02 | ° C. | 33 | 30 | 26 |
| Pressure of methane before | P 12 | mbar | | | |
| Pressure of methane downstream | P 13 | mbar | | | |
| Throughput of biogas | FI 04 | Nm³/h | 3.50 | 3.50 | 3.50 |

-continued

| | | | | |
|---|---|---|---|---|
| Water hardness tank | — | — | — | — |
| Temperature of water tank | — | 26.8 | 26.8 | — |
| Methane content according to biogas plant | °C. | 53 | 53 | 53 |
| Ambient temperature in hanger | % | 24 | 22 | 14 |
| Exterior temperature | °C. | 15 | 14 | 10 |
| pH in tank | °C. | 5.68 | 5.74 | — |

A distinct relationship between the biogas volume flowing over the membrane in the gas exchange module 2 and the effectiveness of the removal of undesirable gases from the biogas to be treated, for example hydrogen sulfide ($H_2S$) and carbon dioxide ($CO_2$), is apparent. Critical factors determining the effectiveness are both the partial pressures of the individual components of the biogas, and also the flow conditions prevailing at the surface of the membrane.

The invention and the above-described examples have shown that a plant and a process of the type described herein are particularly suitable for treating methane-containing gas from natural sources, for example biogas, in such a way that it has an increased methane content.

The invention claimed is:

1. A system for treating methane-containing gas from natural sources, which comprises:
    a) at least one degassing module (1) and/or at least one trickle tower (10),
    b) at least one gas exchange module (2), and
    c) a water circuit comprising water (11),
        wherein the water circuit connects the degassing module (1) and/or the trickle tower (10) and the gas exchange module (2), which are arranged in series in the flow direction of the water (11),
        where the water (11) is degassed in the degassing module (1) and/or the trickle tower (10) and the degassed water takes up undesirable gases from the methane-containing gas from natural sources which is fed in in the gas exchange module (2) and
        where the gas from natural sources which is fed in is introduced into the at least one gas exchange module (2) in countercurrent to the degassed water (11),
    characterized in that
        the water (11) in said water circuit is deionized water having a conductivity of less than 500 μS/cm.

2. The system of claim 1, wherein the at least one degassing module (1) and the at least one gas exchange module (2) each comprise a hollow-fiber water-impermeable and gas permeable-membrane.

3. The system of claim 1, wherein the plant further comprises at least one water tank (3) which is arranged upstream of the degassing module (1) and/or downstream of the trickle tower (10) and which provides said water (11) for the water circuit.

4. The system of claim 1, further comprising at least one vacuum pump (6) which applies a vacuum to the degassing module (1).

5. The system of claim 1, further comprising at least one apparatus for desulfurization (7) which is arranged upstream of the gas exchange module (2).

6. The system of claim 5, wherein the apparatus for desulfurization (7) is an activated carbon filter.

7. The system of claim 1, further comprising at least one compressor (9) which compresses the methane-containing gas from natural sources which is to be treated.

8. The system of claim 7, wherein said compressor (9) is arranged upstream of the gas exchange module (2).

9. The system of claim 7, wherein said gas exchange module (2) is operationally connected to an instrument for measuring the pressure of the gas from natural sources.

10. The system of claim 1, wherein at least one deionization plant is installed upstream of the degassing module (1).

11. The system of claim 10, wherein said at least one deionization plant is mobile.

12. The system of claim 10, wherein said at least one deionization plant is located upstream of the water tank (3).

13. The system of claim 1, wherein the at least one degassing module (1) and/or the at least one trickle tower (10) and the at least one gas exchange module (2) are physically separated.

14. The system of claim 1, wherein at least one trickle tower (10) which additionally removes gases dissolved in the water (11) before degassing of the water (11) in the degassing module (1) is installed upstream of the at least one degassing module (1).

15. A process for treating methane-containing gas from natural sources, which comprises the steps:
    a) degasification of water (11) in at least one degassing module (1) and/or at least one trickle tower (10) and
    b) gas exchange of the degassed water (11) from step a) in at least one gas exchange module (2),
    with undesirable gases present in the methane-containing gas from natural sources which is fed in going over from the gas phase of the gas from natural sources into the aqueous phase of the degassed water (11),
    wherein steps a) and b) are carried out in succession, where the degassing module (1) and/or the trickle tower (10) of step a) and the gas exchange module (2) of step b) are connected in a water circuit and are arranged in series in the flow direction of the water (11), and
    wherein the methane-containing gas from natural sources is introduced into the at least one gas exchange module (2) in countercurrent to the degassed water,
    and characterized in that said water (11) is deionized before step a), with the conductivity of the deionized water being less than 500 μS/cm.

16. The process of claim 15, wherein the conductivity of the deionized water is less than 400 μS/cm.

17. The process of claim 15, wherein the conductivity of the deionized water is less than 300 μS/cm.

18. The process of claim 15, wherein the hardness of the deionized water is less than 0.2° dH.

19. The process of claim 15, wherein the hardness of the deionized water is less than 0.1° dH.

20. The process of claim 15, wherein the hardness of the deionized water is less than 0.05° dH.

21. The process of claim 15, wherein the undesirable gases removed from the methane-containing gas from natural sources in step b) comprise hydrogen sulfide ($H_2S$) and carbon dioxide ($CO_2$).

22. The process of claim 15, wherein the methane content of the treated gas from natural sources after step b) is greater than 80%.

23. The process of claim 15, wherein the methane content of the treated gas from natural sources after step b) is greater than 85%.

24. The process of claim 15, wherein the methane content of the treated gas from natural sources after step b) is greater than 90%.

25. The process of claim 15, wherein the methane content of the treated gas from natural sources after step b) is greater than 95%.

26. The process of claim 15, wherein the methane content of the treated gas from natural sources after step b) is greater than 98%.

27. The process of claim 15, wherein the methane-containing gas from natural sources is dried and desulfurized and/or compressed before entering the gas exchange module (2) in step b).

28. The process of claim 27, wherein the methane-containing gas from natural sources is dried and desulfurized and/or compressed by means of at least one condenser for drying (8) and at least one apparatus for desulfurization (7) and/or at least one compressor (9).

29. The process of claim 15, wherein steps a) and b) are carried out physically separately.

30. The process of claim 15, wherein the treated gas from natural sources after step b) is dried before leaving the plant.

31. The process of claim 15, wherein said process is carried out in a plant of claim 1.

32. The process of claim 15, wherein the degassing of water (11) in at least one degassing module (1) in step a) is preceded by an additional degassing step in at least one trickle tower (10) which additionally removes gases dissolved in the water before degassing of the water in the degassing module (1).

33. The process of claim 15, wherein the degassing of water (11) in at least one degassing module (1) in step a) is replaced by a trickle tower (10) which serves to minimize the gases present in the water.

* * * * *